United States Patent
Arimune

(10) Patent No.: US 9,327,801 B2
(45) Date of Patent: May 3, 2016

(54) DRIVING UNIT AND BATTERY-ASSISTED BICYCLE

(71) Applicant: YAMAHA HATSUDOKI KABUSHIKI KAISHA, Iwata-shi, Shizuoka (JP)

(72) Inventor: Nobuyasu Arimune, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 212 days.

(21) Appl. No.: 14/102,790

(22) Filed: Dec. 11, 2013

(65) Prior Publication Data

US 2014/0166383 A1    Jun. 19, 2014

(30) Foreign Application Priority Data

Dec. 14, 2012   (JP) ................................ 2012-272966

(51) Int. Cl.
  *B62M 6/40* (2010.01)
  *B62M 6/45* (2010.01)
  *B62M 6/50* (2010.01)
  *B62M 6/55* (2010.01)

(52) U.S. Cl.
  CPC . *B62M 6/50* (2013.01); *B62M 6/45* (2013.01); *B62M 6/40* (2013.01); *B62M 6/55* (2013.01)

(58) Field of Classification Search
  CPC ............ B62M 6/00; B62M 6/10; B62M 6/15; B62M 6/20; B62M 6/40; B62M 6/45; B62M 6/50; B62M 6/55
  See application file for complete search history.

(56) References Cited

U.S. PATENT DOCUMENTS

| 5,370,200 A | * | 12/1994 | Takata | .................. | B60L 3/0092 |
| | | | | | 180/206.4 |
| 5,505,277 A | * | 4/1996 | Suganuma | ............... | B62M 6/55 |
| | | | | | 180/206.3 |

(Continued)

FOREIGN PATENT DOCUMENTS

| CN | 1123240 A | 5/1996 |
| CN | 1990334 A | 7/2007 |
| CN | 102498007 A | 6/2012 |
| DE | 10 2010 028 644 A1 | 11/2011 |
| DE | 10 2010 039 852 A1 | 3/2012 |
| EP | 0 635 423 A1 | 1/1995 |

(Continued)

OTHER PUBLICATIONS

Official Communication issued in corresponding European Patent Application No. 13196776.2, mailed on Mar. 31, 2014.

*Primary Examiner* — Joseph Rocca
*Assistant Examiner* — Marc A Scharich
(74) *Attorney, Agent, or Firm* — Keating and Bennett, LLP

(57) ABSTRACT

A battery-assisted bicycle includes a driving unit that accurately detects a failure in each of a torque detector, a crank rotation detector, and a motor rotation detector. The driving unit includes a crankshaft to which pedals are to be connected, a motor rotation detector that detects rotation of an electric motor, a torque detector that detects a torque generated at the crankshaft, a crank rotation detector that detects rotation of the crankshaft, and a sensor failure detector that detects a failure in at least one of the motor rotation detector, the torque detector, and the crank rotation detector based on detection results from the motor rotation detector, the torque detector, and the crank rotation detector.

17 Claims, 13 Drawing Sheets

(56) References Cited

U.S. PATENT DOCUMENTS

| | | | |
|---|---|---|---|
| 5,664,636 A | 9/1997 | Ikuma et al. | |
| 5,798,702 A * | 8/1998 | Okamoto | B62M 6/45 180/220 |
| 5,806,621 A * | 9/1998 | Soda | B60L 11/1801 180/206.2 |
| 5,857,537 A | 1/1999 | Matsumoto et al. | |
| 6,446,745 B1 * | 9/2002 | Lee | B60L 1/14 180/206.2 |
| 2012/0197473 A1 | 8/2012 | Kshatriya | |
| 2013/0027052 A1 * | 1/2013 | Matsumoto | B62J 99/00 324/511 |

FOREIGN PATENT DOCUMENTS

| | | |
|---|---|---|
| EP | 0 697 330 A1 | 2/1996 |
| JP | 07-172376 A | 7/1995 |
| JP | 07-309283 A | 11/1995 |
| JP | 08-034383 A | 2/1996 |
| JP | 08-276887 A | 10/1996 |
| JP | 10-167162 A | 6/1998 |
| JP | 3108311 B2 | 11/2000 |
| JP | 3412412 B2 | 6/2003 |
| JP | 3467922 B2 | 11/2003 |
| JP | 4129084 B2 | 7/2008 |
| WO | 2011/138138 A1 | 11/2011 |

* cited by examiner

DRIVING UNIT AND BATTERY-ASSISTED BICYCLE

BACKGROUND OF THE INVENTION

1. Field of the Invention

The present invention relates to a driving unit and a battery-assisted bicycle that assists a rider's pedaling effort with a driving force from an electric motor.

2. Description of the Related Art

There has been a known battery-assisted bicycle that detects a torque generated at a crankshaft rotated together with pedals by a torque detector and controls an electric motor based on a detection result in order to assist the rider's pedaling effort. In such a battery-assisted bicycle, a torque generated at the crankshaft during rotation of the pedals by a rider is detected as a pedaling effort using a tension meter as disclosed in Japanese Patent No. 3412412.

In such a structure adapted to detect a torque generated at the crankshaft, if the torque detector that detects a torque has a failure, appropriate assist control based on the rider's pedaling effort cannot be achieved.

In contrast, there has been a known battery-assisted bicycle that includes a rotation speed sensor adapted to detect a rotation speed of pedals and detects a state of each sensor based on a comparison between a rotation speed sensor signal obtained from the rotation speed sensor and a torque sensor signal obtained from a torque sensor, for example, as disclosed in International Publication No. WO 2011/138138. More specifically, in the disclosed battery-assisted bicycle, a first pedal driving state determined based on a rotation speed sensor signal obtained from the rotation speed sensor for the pedals is compared to a second pedal driving state determined based on a torque sensor signal obtained from the torque sensor, and an error signal is output if they are different.

In the structure disclosed in International Publication WO 2011/138138, an error signal is output if either the torque sensor or the rotation speed sensor experiences a failure. More specifically, the structure disclosed in International Publication WO 2011/138138 allows a failure in the torque sensor and the rotation speed sensor to be detected.

In a battery-assisted bicycle, a pedaling effort acting on a crankshaft and rotation of the crankshaft do not always correspond to each other. In other words, the crankshaft may rotate with no pedaling effort or a pedaling effort may be generated with no rotation of the crankshaft. In the former case, the crankshaft may rotate through a chain in response to rotation of the wheels, for example, on a downslope. In the latter case, a rider may place the feet on the pedals, for example, when the bicycle is in a stationary state.

As described above, depending on the state of the battery-assisted bicycle, a pedal driving state obtained from pedaling effort does not always coincide with a pedal driving state obtained from the crankshaft. Therefore, the failure determination accuracy may be reduced when a failure in each of the sensors is determined based on a determination result indicating an inconsistency between the first pedal driving state obtained from the rotation speed sensor signal related to the rotation speed of the pedals and the second pedal driving state obtained from the torque sensor signal, as disclosed in International Publication No. WO 2011/138138 mentioned above.

As described above, failures in the sensors for use in assist control in a battery-assisted bicycle (such as a torque detector, a crank rotation detector, and a motor rotation detector) cannot be detected with high accuracy using the conventional structure.

SUMMARY OF THE INVENTION

A preferred embodiment of the present invention provides a driving unit and a battery-assisted bicycle that accurately detects a failure in each of a torque detector, a crank rotation detector, and a motor rotation detector for use in assist control for the battery-assisted bicycle.

A driving unit according to a preferred embodiment of the present invention assists a rider's pedaling effort by providing a driving force from an electric motor. The driving unit includes a crankshaft to which pedals are to be connected, a motor rotation detector that detects rotation of the electric motor, a torque detector that detects a torque generated at the crankshaft, a crank rotation detector that detects rotation of the crankshaft, and a sensor failure detector that detects a failure in at least one of the motor rotation detector, the torque detector, and the crank rotation detector based on detection results from the motor rotation detector, the torque detector, and the crank rotation detector.

The driving unit according to a preferred embodiment of the present invention accurately detects a failure in each of the torque detector, the crank rotation detector, and the motor rotation detector for use in assist control for the battery-assisted bicycle with.

The above and other features, elements, steps, characteristics, and advantages of the present invention will become more apparent from the following detailed description of the preferred embodiments of the present invention with reference to the attached drawings.

DETAILED DESCRIPTION OF THE PREFERRED EMBODIMENTS

Now, preferred embodiments of the present invention will be described in conjunction with the accompanying drawings, in which the components shown are not drawn to scale.

In the following description, the front, back, left, and right refer to these directions as viewed from a rider seated on a seat 24 of a battery-assisted bicycle 1 and holding a handle 23.

First Preferred Embodiment

Figure 1:
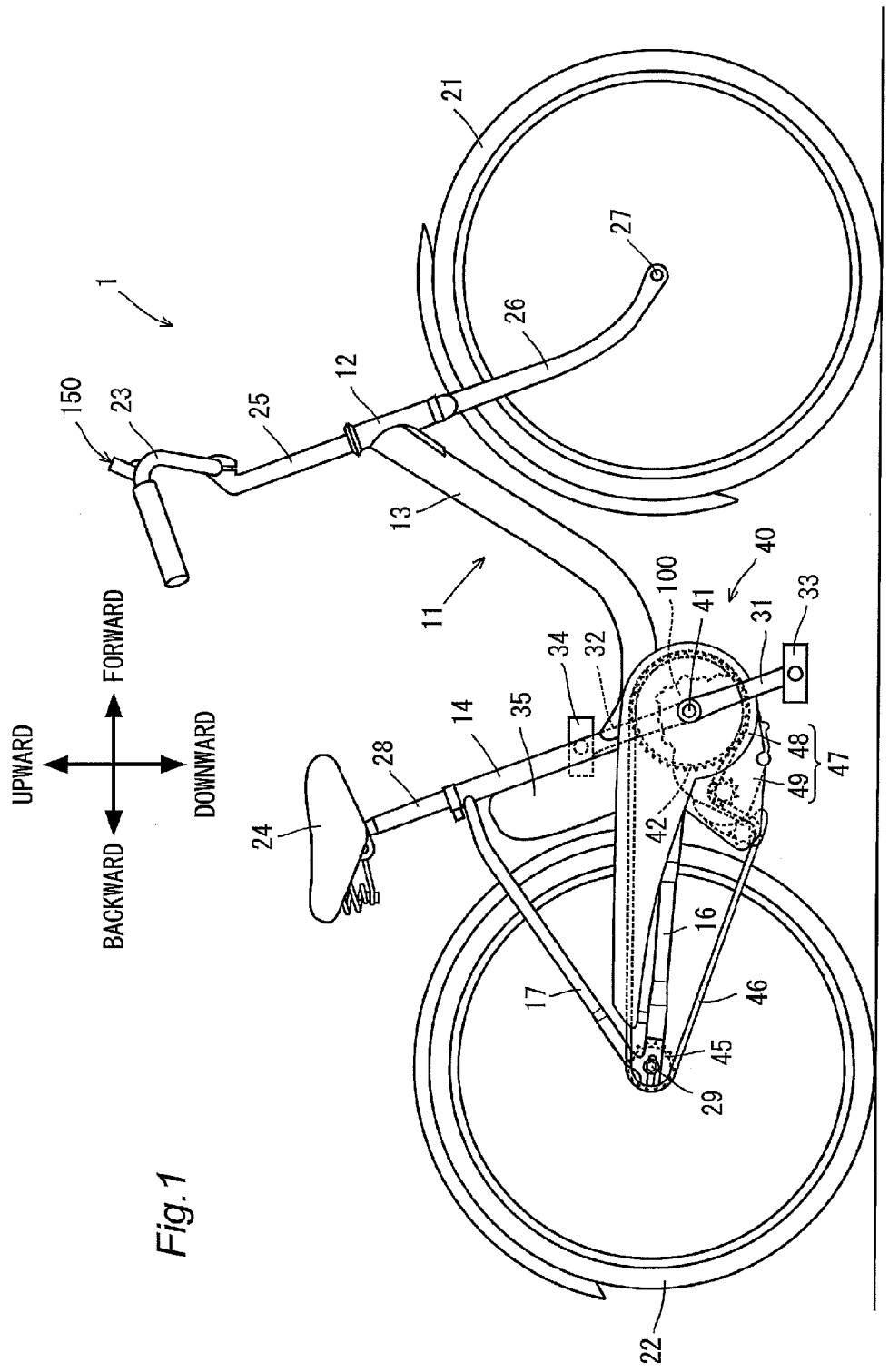
FIG. 1 is a right side view of a general structure of a battery-assisted bicycle according to a first preferred embodiment of the present invention.
Figure 2:
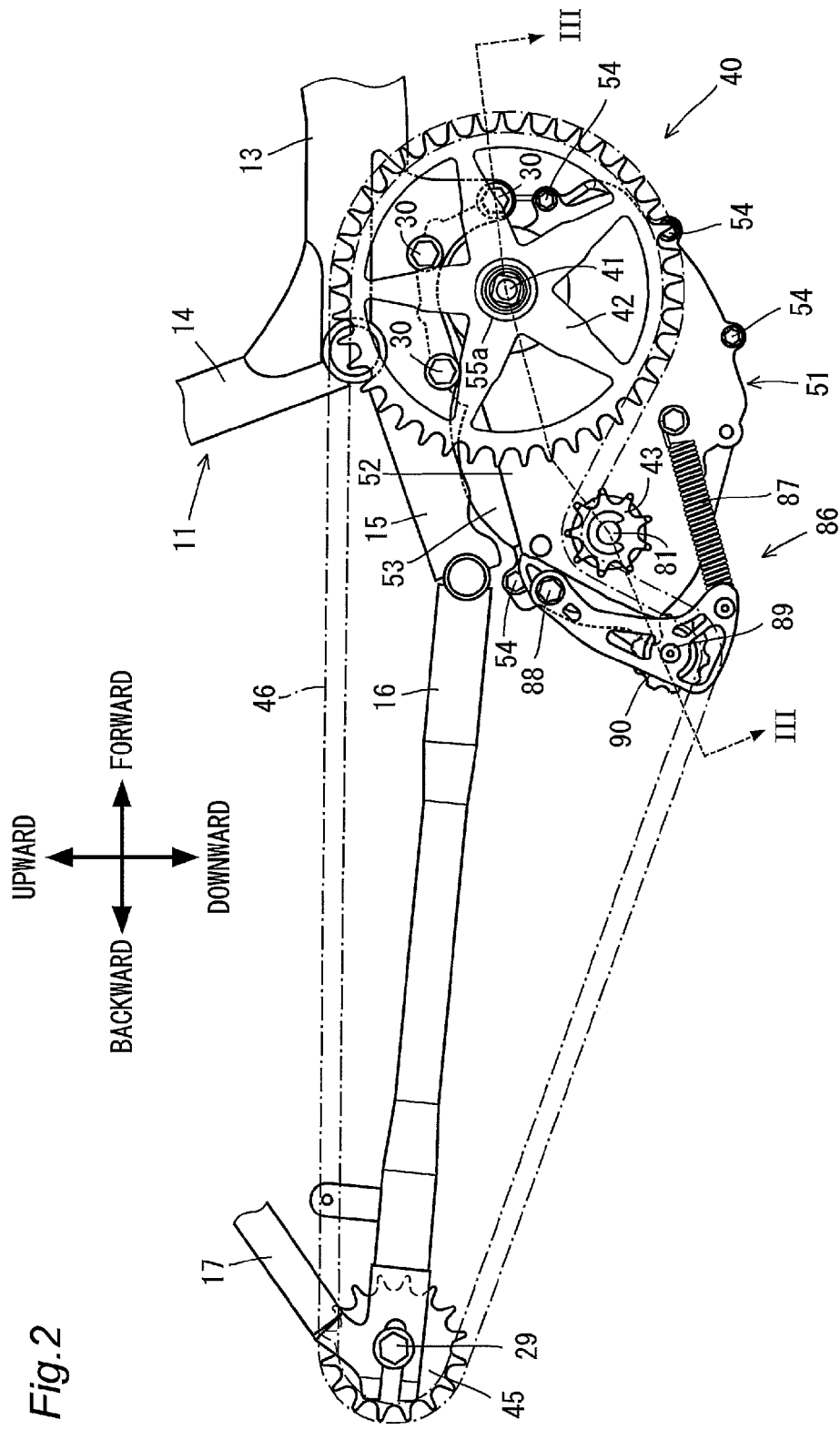
FIG. 2 is a view of a general structure of a driving unit and a driven sprocket in the battery-assisted bicycle according to the first preferred embodiment of the present invention.

FIG. 1 shows a general structure of a battery-assisted bicycle 1 according to a first preferred embodiment of the present invention. FIG. 2 shows a general structure of a driving unit 40 and a driven sprocket 45 of the battery-assisted bicycle 1. As will be described, in this battery-assisted bicycle 1, a pedaling effort generated by a rider pushing on pedals 33 and 34 (see FIG. 1) is assisted by providing a driving force output by an electric motor 61 (see FIG. 3). More specifically, the battery-assisted bicycle 1 includes a driving mechanism that assists the pedaling effort in addition to a general structure as a bicycle.

As shown in FIG. 1, the battery-assisted bicycle 1 includes a vehicle body frame 11 that extends in a front-back direction. The battery-assisted bicycle 1 includes a front wheel 21, a rear wheel 22, the handle 23, the seat 24, and the driving unit 40.

The vehicle body frame 11 includes a head pipe 12, a down frame 13, a seat frame 14, a bracket 15 (see FIG. 2), a pair of chain stays 16, and a pair of seat stays 17. As shown in FIG. 1, the head pipe 12 is provided at a front portion of the battery-assisted bicycle 1. The head pipe 12 is connected with a front side of the down frame 13 that extends rearward. The seat frame 14 is connected to a rear side of the down frame 13 and extends upward and obliquely rearward from a rear end of the down frame 13.

As shown in FIG. 2, the bracket 15 is attached to the rear side of the down frame 13. The pair of chain stays 16 is connected to a rear side of the bracket 15 as the stays hold the rear wheel 22 between them in a left-right direction. As shown in FIG. 1, the seat stays 17 each have one end connected to one of the chain stays 16. The seat stays 17 have their other ends connected to the seat frame 14.

The head pipe 12 includes a handle stem 25 rotatably inserted therein. The handle 23 is fixed at an upper end of the handle stem 25. The handle 23 is attached with an indicator 150 used to indicate information related to assist control to a rider. A front fork 26 is fixed to a lower end of the handle stem 25. The front wheel 21 is supported rotatably by an axle 27 at a lower end of the front fork 26.

A seat pipe 28 is inserted inside the cylindrical seat frame 14. The seat 24 is provided at an upper end of the seat pipe 28.

As shown in FIGS. 1 and 2, the rear wheel 22 is rotatably supported by an axle 29 at rear ends of the pair of chain stays 16. The driven sprocket 45 is provided coaxially with the axle 29 on the right side of the rear wheel 22. The driven sprocket 45 is coupled to the rear wheel 22 through a one-way clutch 92 (see FIG. 4).

As shown in FIG. 2, the driving unit 40 is fixed to the bracket 15 by a plurality of metal fasters 30. The structure of the driving unit 40 will be described. As shown in FIGS. 1 and 2, an endless chain 46 is wound around a driving sprocket 42 (that will be described) of the driving unit 40 and the driven sprocket 45 provided at the rear wheel 22. A chain cover 47 is attached to the vehicle body frame 11 to cover the driving unit 40 and the chain 46 (see FIG. 1). The chain cover 47 includes a main cover 48 and a sub cover 49. The main cover 48 covers a right portion of the driving sprocket 42 and extends in the front-back direction. The sub cover 49 covers a rear right portion of the driving unit 40.

As shown in FIG. 1, crank arms 31 and 32 are attached to both ends of the crankshaft 41 of the driving unit 40 that will be described. The crank arms 31 and 32 are attached with pedals 33 and 34, respectively, at their tip ends.

As shown in FIG. 1, a battery unit 35 used to supply electric power to the electric motor 61 of the driving unit 40 that will be described is provided behind the seat frame 14. The battery unit 35 includes a battery and a battery controller that are not shown. The battery is a chargeable/dischargeable battery. The battery controller controls charge/discharge to/from the battery and also monitors the output current and remaining capacity of the battery.

Figure 3:
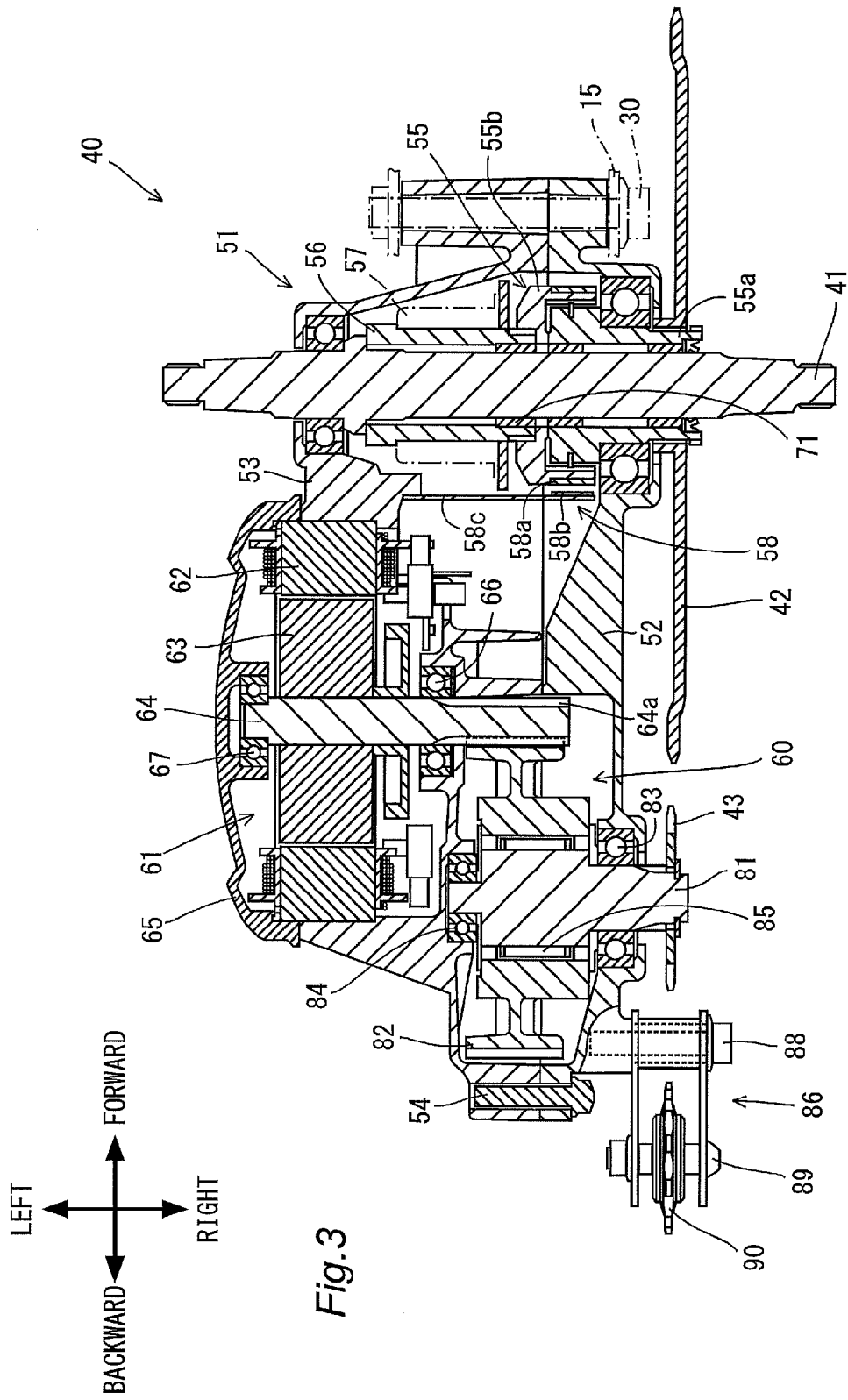
FIG. 3 is a sectional view taken along line III-III in FIG. 2.

FIG. 3 is a sectional view of a general structure of the driving unit 40. FIG. 3 is a sectional view taken along line III-III in FIG. 2.

Figure 4:
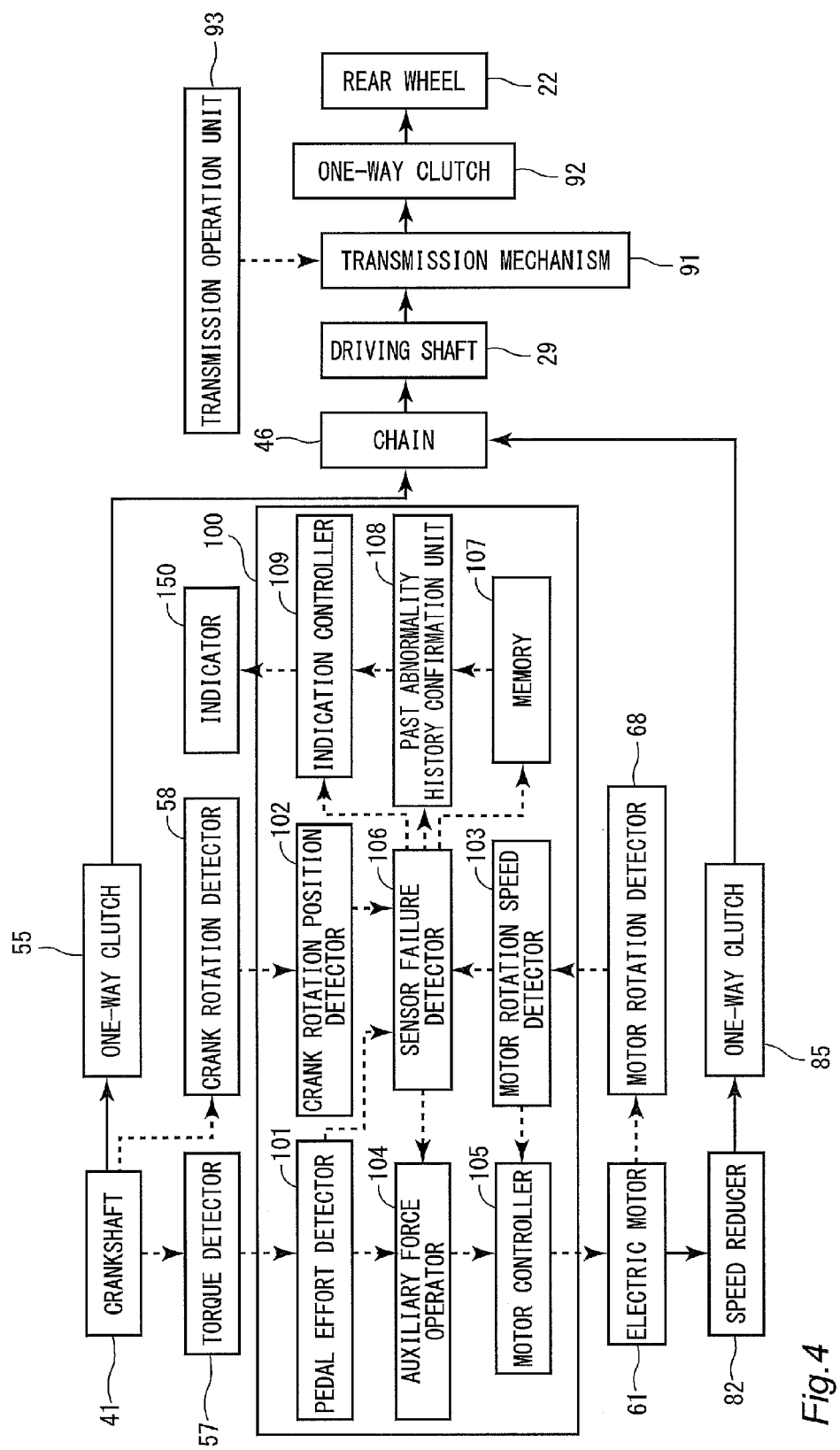
FIG. 4 is a schematic block diagram of motive power transmission and signal transmission paths in the battery-assisted bicycle according to the first preferred embodiment of the present invention.

As shown in FIG. 3, the driving unit 40 includes a main body 51, the crankshaft 41, the driving sprocket 42, a driving force generator 60, an auxiliary sprocket 43, a chain tensioner 86, and a controller 100 (see FIGS. 1 and 4). The driving unit 40 includes a motor rotation detector 68, a torque detector 57, and a crankshaft rotation detector 58.

The main body 51 includes a first case portion 52 and a second case portion 53 assembled with each other in the left-right direction. The first and second case portions 52 and 53 are fixed to each other by a plurality of metal fasteners 54 (see FIGS. 2 and 3). The main body 51 is attached to the bracket 15 by the above-described metal fasteners 30.

As shown in FIG. 3, the crankshaft 41 is provided through the main body 51 in the left-right direction and supported rotatably at a front end of the main body 51. The crankshaft 41 is supported rotatably by the first and second case portions 52 and 53 through a plurality of bearings. A substantially cylindrical inner member 55a that rotates together with the crankshaft 41 is provided on one side of the crankshaft 41. As described above, the crank arms 31 and 32 are connected to both ends of the crankshaft 41, so that the crankshaft 41 rotates as a rider pushes on the pedals 33 and 34.

The driving sprocket 42 is attached to a right end of the outer circumferential surface of the inner member 55a. The crankshaft 41, the inner member 55a, and the driving sprocket 42 are provided coaxially to one another.

A substantially cylindrical rotation member 56 is provided coaxially with the crankshaft 41 at an axially central portion of the crankshaft 41. A right end of the rotation member 56 is supported at the crankshaft 41 through a cylindrical slider bearing 71. A left end of the rotation member 56 is connected to the crankshaft 41, for example, by a spline mechanism. In this manner, the rotation member 56 rotates together with the crankshaft 41.

A torque detector 57 is provided coaxially with the rotation member 56. An example of the torque detector 57 includes a magneto-strictive torque sensor. When the torque detector 57 is a magneto-strictive type torque sensor, the torque detector 57 includes a coil opposed to an outer circumferential surface of the rotation member 56. The torque detector 57 including such a structure detects a distortion of the rotation member 56 as a voltage change across the coil in order to detect a torque at the crankshaft 41. The torque detector 57 outputs a signal based on the detected torque to the controller 100 (FIG. 4) that will be described. The controller 100 controls the electric motor 61 (that will be described) based on the signal output from the torque detector 57. Note that the torque detector 57 may have a structure other than that of the magneto-strictive torque sensor as far as the structure is capable of detecting the pedaling effort.

A one-way clutch (crank side one-way clutch) 55 includes a substantially cylindrical outer member 55b provided coaxially with the crankshaft 41 so as to couple the rotation member 56 and the inner member 55a. A left end of the outer member 55b and a right end of the rotation member 56 are connected, for example, by a spline mechanism. In this manner, the outer member 55b rotates together with the rotation member 56.

A right end of the outer member 55b and a left end of the inner member 55a are connected, for example, by a latch mechanism so that only rotation force in one direction is transmitted from the outer member 55b to the inner member 55a. In this manner, a rotation force in a forward turning direction (clockwise as viewed from the right) is transmitted from the outer member 55b to the inner member 55a. However, a rotation force in a backward turning direction (anticlockwise as viewed from the right) is not transmitted from the outer member 55b to the inner member 55a.

This structure allows a rider's pedaling effort to be transmitted from the crankshaft 41 to the inner member 55a through the rotation member 56 and the outer member 55b when the rider pushes on the pedals 33 and 34 and rotate the crankshaft 41 to propel the battery-assisted bicycle 1. Therefore, the inner member 55a and the driving sprocket 42 are turned forward. On the other hand, when the rider turns the crankshaft 41 backward, the rotation is not transmitted from the outer member 55b to the inner member 55a. Therefore, the inner member 55a and the driving sprocket 42 are not turned backward.

As shown in FIG. 3, a substantially cylindrical magnet 58a is provided on an outer circumferential surface of the outer member 55b of the one-way clutch 55. An encoder 58b including a Hall element is provided in a position opposed to a portion of the outer circumferential surface of the magnet 58a. The encoder 58b is held on an inner surface of the second case portion 53 by a resin support member 58c. The encoder 58b detects a change in the magnetic field of the magnet 58a provided on the outer circumferential surface of the outer member 55b. In this manner, rotation of the crankshaft 41 connected with the outer member 55b is detected. In other words, the magnet 58a and the encoder 58b define a crank rotation detector 58 that detects rotation of the crankshaft 41. The crankshaft rotation detector 58 outputs a pulse signal when the encoder 58b detects a change in the magnetic field of the magnet 58a.

The driving force generator 60 is provided behind the crankshaft 41 in the first and second case portions 52 and 53. The driving force generator 60 includes the electric motor 61, an output shaft 81, and a gear 82.

The electric motor 61 generates an auxiliary driving force used to assist the battery-assisted bicycle 1 in travelling based on a control signal output from the controller 100 that will be described. In addition, the electric motor 61 is controlled to change the auxiliary driving force used to assist the battery-assisted bicycle 1 in travelling in response to an assist mode.

The electric motor 61 includes a stator 62, a rotor 63, and a rotation shaft 64. The stator 62 is fixed to the second case portion 53. The second case portion 53 is attached with a motor cover 65 to cover a left side portion of the electric motor 61. The rotation shaft 64 is provided through and fixed to the rotor 63. The rotation shaft 64 is supported rotatably at the second case portion 53 and the motor cover 65 through rolling bearings 66 and 67. A gear groove 64a is provided at a right end of the rotation shaft 64.

Although not shown, the controller 100 that will be described is provided in the vicinity of the electric motor 61. According to a preferred embodiment, the controller 100 is preferably provided near the electric motor 61, but the controller 100 may be provided at any other location.

Although not shown, the electric motor 61 is provided with a motor rotation detector 68 (see FIG. 4) used to detect rotation of the rotor 63. The motor rotation detector 68 includes an encoder to detect rotation of the rotor 63 of the electric motor 61. Note that the encoder is an encoder generally provided in the electric motor 61 and used to control rotation of the electric motor 61. In other words, the encoder according to the present preferred embodiment preferably has the same structure as that of a conventional general encoder, for example.

As shown in FIG. 3, the output shaft 81 is supported rotatably at the main body 51 in a position behind the crankshaft 41. More specifically, the output shaft 81 is supported rotatably at the first and second case portions 52 and 53 through rolling bearings 83 and 84.

The gear 82 is provided coaxially with the output shaft 81 between the rolling bearings 83 and 84. The gear 82 engages with the gear groove 64a provided in the rotation shaft 64 of the electric motor 61. In this manner, an auxiliary driving force generated at the electric motor 61 is transmitted to the gear 82 and the gear 82 is rotated. According to the present preferred embodiment, the electric motor 61 is preferably arranged so that the rotation shaft 64 turns forward. The gear 82 therefore rotates backward due to the auxiliary driving force transmitted from the rotation shaft 64.

A one-way clutch (motor side one-way clutch) 85 is provided between the gear 82 and the output shaft 81. The one way clutch 85 is arranged to transmit a rotation force in the backward turning direction but not in the forward turning direction from the gear 82 to the output shaft 81.

The auxiliary sprocket 43 is provided coaxially with the output shaft 81 at a right end of the output shaft 81. The auxiliary sprocket 43 and the output shaft 81 are connected with each other, for example, by a spline mechanism. In this manner, an auxiliary driving force generated at the driving force generator 60 is transmitted to the auxiliary sprocket 43 from the output shaft 81. In this manner, the auxiliary sprocket 43 is turned backward.

The chain tensioner 86 is provided at a rear end of a rear end of a right side surface of the first case portion 52. As shown in FIG. 2, the chain tensioner 86 includes one end side connected to the first case portion 52 through a tension spring 87. The chain tensioner 86 has its other end side connected rotatably to the first case portion 52 by a support bolt 88. A tension sprocket 90 that is rotatable to a support bolt 89 is provided on the chain tensioner 86. The chain 46 (motive power transmission member) is wound around the tension sprocket 90 so that the tension sprocket 90 is pushed backward. Therefore, the chain 46 is adjusted to have an appropriate tension by the chain tensioner 86.

The controller 100 carries out assist control for the battery-assisted bicycle 1 and stores various kinds of information displayed by the indicator 150. As shown in FIG. 4, the controller 100 includes a pedaling effort detector 101, a crank rotation position detector 102, a motor rotation speed detector 103, an auxiliary force operator 104 (assist controller), a motor controller 105, a sensor failure detector 106, a memory 107, a past abnormality history confirmation unit 108, and an indication controller 109.

The pedaling effort detector 101, the motor rotation speed detector 103, the auxiliary force operator 104, the motor controller 105, and the sensor failure detector 106 operate during assist control by the electric motor 61. The pedaling effort detector 101, the crank rotation position detector 102, the motor rotation speed detector 103, and the sensor failure detector 106 operate to detect a failure in any of the torque detector 57, the crank rotation detector 58, and the motor rotation detector 68. The indication controller 109 operates when various kinds of information are displayed by the indicator 150. The structure of the controller 100 will be described in detail.

FIG. 4 is a block diagram showing how signals are received/transmitted and motive power is transmitted during assist control by the electric motor 61 in the battery-assisted bicycle 1. In FIG. 4, the signal transmission/reception during assist control is designated by the broken line arrow and the motive power transmission is designated by the solid line arrow. Note that among the reference characters in FIG. 4, the same reference characters as those shown in FIGS. 1 to 3 represent the same elements in the battery-assisted bicycle 1.

Assist control in the battery-assisted bicycle 1 is achieved by controlling the driving of the electric motor 61 in response to a pedaling effort by a rider using the controller 100. More specifically, the controller 100 detects the rider's pedaling effort based on a signal output from the torque detector 57 that detects a torque at the crankshaft 41. The controller 100 is programmed to control the output of the electric motor 61 in response to the detected pedaling effort. The controller 100 is further programmed to control the output of the electric motor 61 in consideration of whether there is a failure in any of the torque detector 57 that detects a torque at the crankshaft 41, the crank rotation detector 58 that detects rotation of the crankshaft 41, and the motor rotation detector 68 that detects rotation of the electric motor 61.

As described above, the controller 100 includes the pedaling effort detector 101, the crank rotation position detector 102, the motor rotation speed detector 103, the auxiliary force operator 104, the motor controller 105, the sensor failure detector 106, the memory 107, the past abnormality history confirmation unit 108, and the indication controller 109.

The pedaling effort detector 101 obtains a pedaling effort by a rider based on a torque at the crankshaft 41 detected by the torque detector 57. The crank rotation position detector 102 detects a rotation speed of the crankshaft 41 based on rotation of the crankshaft 41 detected by the crankshaft rotation detector 58. The motor rotation speed detector 103 obtains a rotation speed of the electric motor 61 based on rotation of the electric motor 61 detected by the motor rotation detector 68.

The auxiliary force operator 104 calculates a necessary driving force from the electric motor 61 based on the pedaling effort detected by the pedaling effort detector 101. The auxiliary force operator 104 calculates a driving necessary force from the electric motor 61 so that assist control is restrained or stopped when the sensor failure detector 106 that will be described detects a failure in any of the detectors. Note that although not described in detail, the auxiliary force operator 104 calculates a necessary driving force from the electric motor 61 in response to an assist mode for assist control for the battery-assisted bicycle 1.

The motor controller 105 is programmed to control driving of the electric motor 61 so that the necessary driving force calculated by the auxiliary force operator 104 is output by the electric motor 61. The motor controller 105 is programmed to control driving of the electric motor 61 in response to the rotation speed of the electric motor 61 detected by the motor rotation speed detector 103.

The sensor failure detector 106 detects whether any of the torque detector 57, the crank rotation detector 58, and the motor rotation detector 68 has a failure based on signals output from the pedaling effort detector 101, the crank rotation position detector 102, and the motor rotation speed detector 103.

More specifically, the sensor failure detector 106 determines that any of the detectors has a failure if the crank rotation detector 58 detects stopping of rotation of the crankshaft 41 or a rotation speed different from an estimated rotation speed of the crankshaft 41 while the torque detector 57 detects generation of a torque at the crankshaft 41, and the motor rotation detector 68 detects rotation of the electric motor 61. In this manner, while the electric motor 61 rotates, the electric motor 61 rotates together with the chain 46 through the gear 82 and the one-way clutch 85, and therefore if a torque is generated at the crankshaft 41, the crankshaft 41 must rotate at a rotation speed equal to a rotation speed estimated based on the rotation speed of the electric motor 61. Therefore, in such a condition, if the rotation speed of the crankshaft 41 obtained from a detection result from the crank rotation detector 58 is not equal to the estimated rotation speed, there should be a failure in any of the torque detector 57, the crank rotation detector 58, and the motor rotation detector 68.

Figure 5:
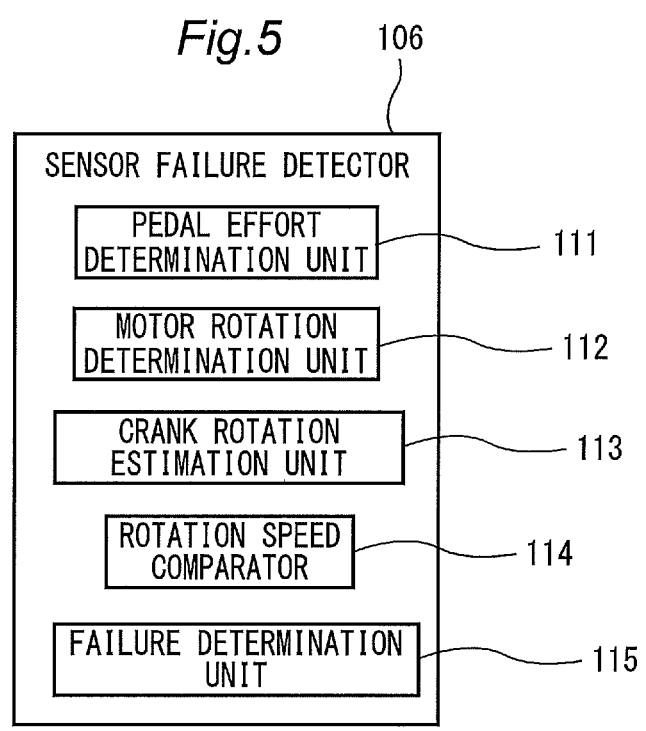
FIG. 5 is a block diagram of a general structure of a sensor failure detector in the battery-assisted bicycle according to the first preferred embodiment of the present invention.

As shown in FIG. 5, the sensor failure detector 106 includes a pedaling effort determination unit 111, a motor rotation determination unit 112, a crank rotation estimation unit 113, a rotation speed comparator 114, and a failure determination unit 115.

The pedaling effort determination unit 111 determines whether a pedaling effort obtained by the pedaling effort detector 101 is greater than a threshold. The threshold is set to a pedaling effort based on which it is determined that a rider pushes on the pedals 33 and 34 to apply the pedaling effort to the crankshaft 41 depending on the detection accuracy of the torque detector 57.

The motor rotation determination unit 112 determines whether the rotation speed of the electric motor 61 obtained by the motor rotation speed detector 103 is not zero. More specifically, the motor rotation determination unit 112 determines whether the electric motor 61 rotates. The motor rotation determination unit 112 determines that the electric motor 61 rotates not only when the electric motor 61 is driven but also when the electric motor 61 rotates because of rotation of the chain 46. Note that the motor rotation determination unit 112 may determine that the electric motor 61 rotates when the number of rotation of the electric motor 61 is not less than a prescribed number.

The crank rotation estimation unit 113 estimates a rotation speed of the crankshaft 41 based on the rotation speed of the electric motor 61 obtained by the motor rotation speed detector 103. In this manner, the rotation speed of the crankshaft 41 is estimated based on the rotation speed of the electric motor 61 for the following reason.

As shown in FIG. 2, in the battery-assisted bicycle 1, the driving sprocket 42 connected to the crankshaft 41 through the one-way clutch 55 and the auxiliary sprocket 43 provided at the output shaft 81 that outputs rotation of the electric motor 61 transmit a driving force to the rear wheel 22 through the chain 46. As shown in FIG. 4, the rotation of the chain 46 is transmitted to the rear wheel 22 through the axle 29 (driving shaft) of the rear wheel 22, a transmission mechanism 91, and the one-way clutch 92. The transmission mechanism 91 and the one-way clutch 92 are attached to a side of the rear wheel 22. The transmission mechanism 91 is operated by a transmission operation unit 93 (not shown) provided at the handle 23.

The gear (speed reducer) 82 and the one-way clutch (motor side one-way clutch) 85 are provided between the electric motor 61 and the output shaft 81 as described above. The one-way clutch (crank side one-way clutch) 55 is provided between the crankshaft 41 and the driving sprocket 42. The above-described structure allows rotation of the electric motor 61 and the crankshaft 41 only in one direction to be transmitted to the chain 46 and the crankshaft 41 and the output shaft 81 rotate synchronously with each other when a torque is generated at the crankshaft 41 and the output shaft 81.

In the structure described above, the rotation speed of the electric motor 61 and the rotation speed of the crankshaft 41 are different by a reduction ratio of the electric motor 61 (a reduction ratio based on a reduction ratio of the gear 82 in consideration of a diameter ratio of the driving sprocket 42 and the auxiliary sprocket 43). More specifically, the rotation speed of the crankshaft 41 is estimated using the reduction ratio of the electric motor 61 based on the rotation speed of the electric motor 61.

The rotation speed comparator 114 compares the estimated rotation speed of the crankshaft 41 obtained by the crank rotation estimation unit 113 (hereinafter also referred to as "estimated crank rotation speed") and the rotation speed of the crankshaft 41 obtained by the crank rotation position detector 102 (hereinafter also referred to as "detected crank rotation speed"). The rotation speed comparator 114 outputs an abnormality detection signal if the detected crank rotation speed is different from the estimated crank rotation speed.

The failure determination unit 115 determines that any of the torque detector 57, the crank rotation detector 58, and the motor rotation detector 68 has a failure if the abnormality detection signal is output from the rotation speed comparator 114. The failure determination unit 115 outputs a failure signal upon determining that any of the torque detector 57, the crank rotation detector 58, and the motor rotation detector 68 has a failure. The failure signal is output to the auxiliary force operator 104, the memory 107 (that will be described), the past abnormality history confirmation unit 108, and the indication controller 109.

If the failure signal is output from the sensor failure detector 106, the memory 107 stores information included in the failure signal (such as the output time of the failure signal). The past abnormality history confirmation unit 108 confirms failure information stored in the memory 107 if the failure signal is output from the sensor failure detector 106. The indication controller 109 indicates failure information at the indicator 150 together with the past failure information confirmed by the past abnormality history confirmation unit 108 if the failure signal is output from the sensor failure detector 106.

Now, in the above-described battery-assisted bicycle 1, sensor failure determination, i.e., how a failure is determined by the sensor failure detector 106 in any of the torque detector 57, the crank rotation detector 58, and the motor rotation detector 68 will be described based on the flow shown in FIG. 6.

Figure 6:
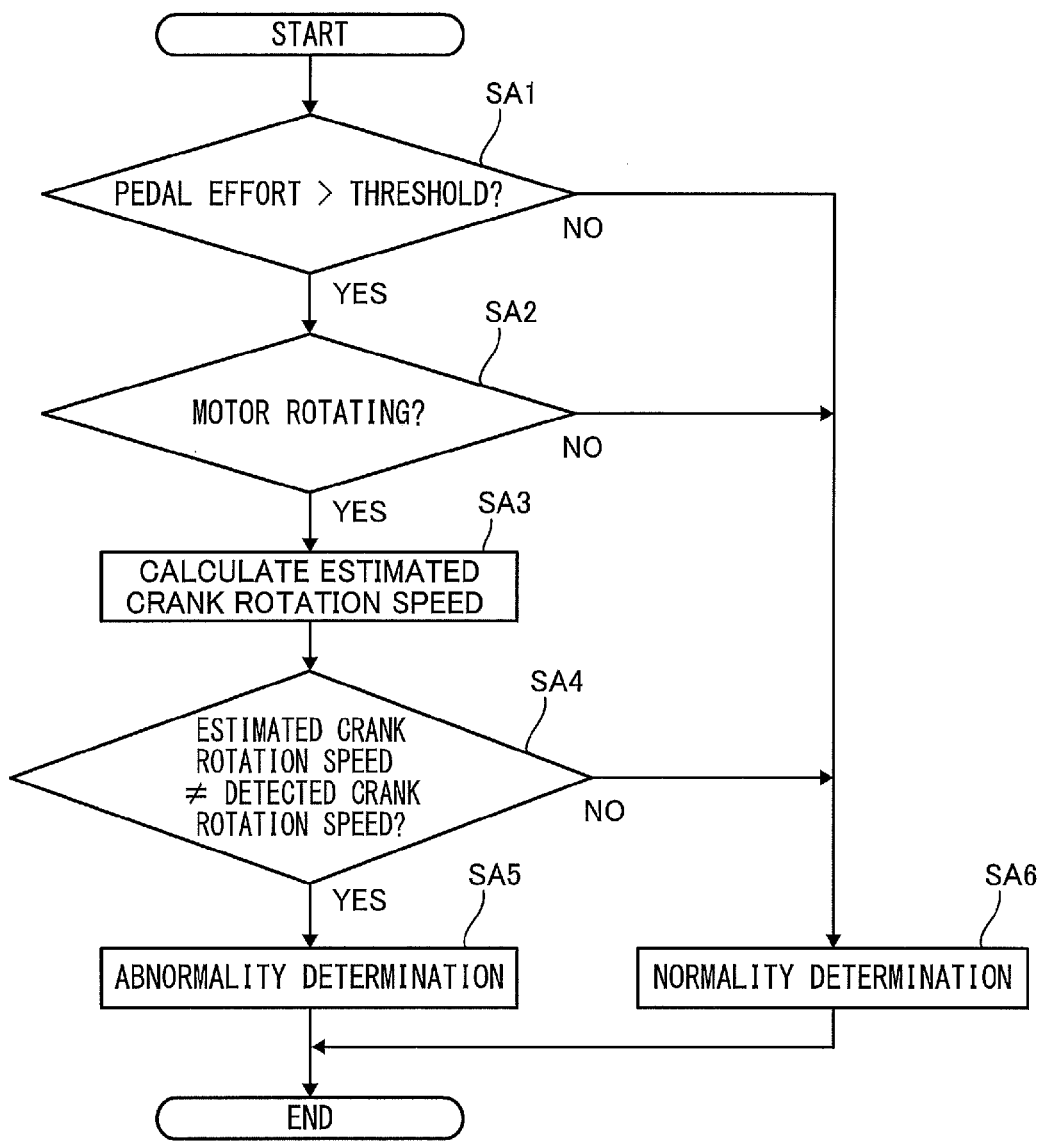
FIG. 6 is a flowchart for illustrating sensor failure determination in the battery-assisted bicycle according to the first preferred embodiment of the present invention.

When the sensor failure determination flow as shown in FIG. 6 starts (START), it is determined in step SA1 by the pedaling effort determination unit 111 whether pedaling effort obtained by the pedaling effort detector 101 is more than a threshold. If it is determined by the pedaling effort determination unit 111 that the pedaling effort is more than the threshold (YES), the control proceeds to step SA2, and it is determined whether the electric motor 61 rotates. If it is determined in step SA1 that the pedaling effort is not more than the threshold (NO), the control proceeds to step SA6 and each detector is determined as being normal, and the flow ends (END).

Note that the pedaling effort threshold is set to a minimum value based within a range unaffected by noises in consideration of the detection accuracy of the torque detector 57 on which application of pedaling effort by a rider to the crankshaft 41 is determined.

It is determined by the motor rotation detector 112 in step SA2 whether the rotation speed of the electric motor 61 obtained by the motor rotation speed detector 103 based on the detection result from the motor rotation detector 68 is zero. In other words, the motor rotation determination unit 112 determines whether the electric motor 61 rotates.

If it is determined in step SA2 that the electric motor 61 rotates (YES), the control proceeds to step SA3, and the crank rotation estimation unit 113 obtains an estimated rotation speed (estimated crank rotation speed) of the crankshaft 41 based on the rotation speed of the motor 61. If it is determined in step SA2 that the electric motor 61 does not rotate (NO), the control proceeds to step SA6, each detector is determined as being normal and the flow ends (END).

After the estimated crank rotation speed is obtained in step SA3, the rotation speed comparator 114 determines whether the estimated crank rotation speed is different from the detected crank rotation speed obtained from the detection result by the crank rotation detector 58. If the estimated crank rotation speed is different from the detected crank rotation speed (YES), it is determined in the succeeding step SA5 that any of the detectors is determined as being abnormal and the flow ends (END). On the other hand, if it is determined in step SA4 that the estimated crank rotation speed is not different from the detected crank rotation speed (NO), the control proceeds to step SA6, each detector is determined as being normal, and the flow ends (END).

In this manner, in the sensor failure determination flow according to the present preferred embodiment, a sensor failure is determined if the estimated crank rotation speed is different from the detected crank rotation speed while a greater pedaling effort than the threshold acts on the crankshaft 41 and the electric motor 61 rotates.

Figure 7:
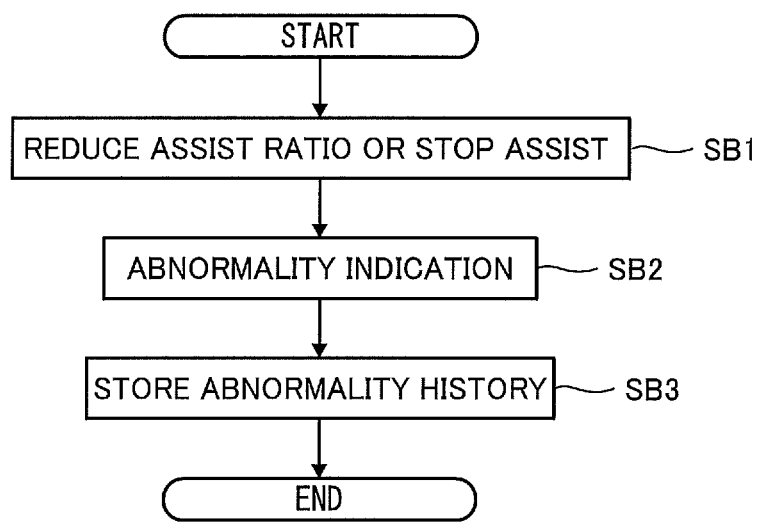
FIG. 7 is a flowchart for illustrating a process after the sensor failure determination.

In the flow shown in FIG. 6, if a sensor failure is determined (abnormality determination), the state is processed according to the flow shown in FIG. 7 in the controller 100.

After the start of the flow shown in FIG. 7 (START), the sensor failure detector 106 outputs a signal used to reduce an assist ratio (the ratio of the driving force of the electric motor 61 to the rider's pedaling effort) or stop the assist control to the auxiliary force operator 104.

In the succeeding step SB2, the sensor failure detector 106 outputs a signal to the indication controller 109 to have an abnormality indicated at the indicator 150. At the time, the sensor failure detector 106 may also output a signal to the indication controller 109 to have an abnormality history confirmed to the past abnormality history confirmation unit 108 or a signal to have a past abnormality history indicated at the indicator 150.

In the succeeding step SB3, the sensor failure detector 106 outputs a signal to have abnormal information recorded to the memory 107. In other words, the sensor failure detector 106 provides the memory 107 with an abnormality signal including abnormality information and has the memory 107 record the abnormality information.

After the above-described steps end, the flow ends (END).

According to the present preferred embodiment, the battery-assisted bicycle 1 includes a crankshaft 41 to which pedals 33 and 34 are to be connected, the motor rotation detector 68 that detects rotation of the electric motor 61, the torque detector 57 that detects a torque generated at the crankshaft 41, the crank rotation detector 58 that detects rotation of the crankshaft 41, and the sensor failure detector 106 that detects a failure in at least one of the motor rotation detector 68, the torque detector 57, and the crank rotation detector 58 based on detection results from the motor rotation detector 68, the torque detector 57, and the crank rotation detector 58. In this manner, a failure, if any, is detected in any of the crank rotation detector 58, the motor rotation detector 68, and the torque detector 57 that are sensors that carry out assist control in the battery-assisted bicycle 1.

According to the present preferred embodiment, the sensor failure detector 106 detects a failure in at least one of the motor rotation detector 68, the torque detector 57, and the crank rotation detector 58 using a detection result from the torque detector 57 and a result of comparison between detection results from the motor rotation detector 68 and the crank rotation detector 58. In this manner, it is determined that any of the detection results from the motor rotation detector 68 and the crank rotation detector 58 is different. Therefore, a failure in at least one of the motor rotation detector 68, the torque detector 57, and the crank rotation detector 58 is easily detected. Note that the detection results refer to output signals from these detectors.

According to the present preferred embodiment, the sensor failure detector 106 converts detection results from the motor rotation detector 68 and the crank rotation detector 58 into one of a rotation speed of the electric motor 61, a rotation speed of the crankshaft 41, and a reduction ratio of the electric motor 61 for comparison. In this manner, the detection result from the motor rotation detector 68 and the detection result from the crank rotation detector 58 is compared easily.

Note that according to the present preferred embodiment described above, the estimated crank rotation speed preferably is obtained based on the rotation speed of the electric motor 61 detected by the motor rotation detector 68 but the estimated rotation speed of the electric motor 61 may be calculated based on a rotation speed of the crankshaft 41 detected by the crank rotation detector 58 or an estimated reduction ratio of the gear 82 may be calculated based on a rotation speed of the electric motor 61 and a rotation speed of the crankshaft 41. The obtained estimated reduction ratio of the gear 82 may be compared to an actual reduction ratio of the gear 82.

According to the present preferred embodiment, the sensor failure detector 106 is arranged to determine whether at least one of the motor rotation detector 68, the torque detector 57, and the crank rotation detector 58 has a failure based on a detection result from the crank rotation detector 58 if a rotation of the electric motor 61 is detected by the motor rotation detector 68 and generation of pedaling effort is detected by the torque detector 57. In this manner, a failure in at least one of these detectors is detected accurately.

In a variation of the present preferred embodiment, the sensor failure detector 106 may be configured to determine whether at least one of the motor rotation detector 68, the torque detector 57, and the crank rotation detector 58 has a failure based on the detection results from the motor rotation detector 68 if the crank rotation detector 58 detects rotation of the crankshaft 41 and the torque detector 57 detects generation of a torque.

According to the present preferred embodiment, the motor rotation detector 68 is arranged to detect the rotation speed of the electric motor 61. The crank rotation detector 58 is arranged to detect the rotation speed of the crankshaft 41. The sensor failure detector 106 includes the crank rotation estimation unit 113 that estimates a rotation speed of the crankshaft 41 based on a rotation speed of the electric motor 61 detected by the motor rotation detector 68, the rotation speed comparator 114 that compares the rotation speed of the crankshaft 41 detected by the crank rotation detector 58 and the rotation speed of the crankshaft 41 estimated by the crank rotation estimation unit 113, and the failure determination unit 115 that determines that at least one of the motor rotation detector 68, the torque detector 57, and the crank rotation detector 58 has a failure if the motor rotation detector 68 detects rotation of the electric motor 61, the torque detector 57 detects generation of pedaling effort, and the rotation speed comparator 114 determines that there is a difference between the detected value and the estimated value for the rotation speed of the crankshaft 41.

In this manner, a structure that accurately detects a failure in at least one of the motor rotation detector 68, the torque detector 57, and the crank rotation detector 58 is provided.

According to the present preferred embodiment, the battery-assisted bicycle 1 preferably further includes the rear wheel 22 driven by a resultant force of rotation driving forces of the crankshaft 41 and the electric motor 61, the chain 46 that transmits the rotation driving forces of the crankshaft 41 and the electric motor 61 to the rear wheel 22, the one-way clutch 55 provided between the crankshaft 41 and the chain 46 to allow motive power to be transmitted only from the crankshaft 41 to the chain 46, and the one-way clutch 85 provided between the electric motor 61 and the chain 46 to allow motive power to be transmitted only from the electric motor 61 to the chain 46.

In such a structure, the crankshaft 41 and the electric motor 61 rotate only in one direction by the function of the one-way clutches 55 and 85, respectively. The crankshaft 41 and the electric motor 61 are rotated by the chain 46. In this manner, the rotation speed of the crankshaft 41 is estimated easily from the rotation speed of the electric motor 61.

According to the present preferred embodiment, the auxiliary force operator 104 is further provided to carry out assist control to drive the electric motor 61 in response to a pedaling effort. The auxiliary force operator 104 restrains or stops the assist control if the sensor failure detector 106 detects a failure in at least one of the motor rotation detector 68, the torque detector 57, and the crank rotation detector 58. In this manner, assist control for the battery-assisted bicycle 1 is restrained or stopped in response to a failure in each of the detectors.

According to the present preferred embodiment, the battery-assisted bicycle 1 further includes the indicator 150 that indicates information to a rider and the indication controller 109 that has the display 150 indicate a result of detection as failure information if the sensor failure detector 106 detects at least one of the motor rotation detector 68, the torque detector 57, and the crank rotation detector 58 has a failure. In this manner, if any of the detectors has a failure, the failure information is indicated at the indicator 150 and thus notified to the rider.

According to the present preferred embodiment, the battery-assisted bicycle 1 further includes the memory 107 that stores a detection result from the sensor failure detector 106 as failure information if the sensor failure detector 106 detects a failure in at least one of the motor rotation detector 68, the torque detector 57, and the crank rotation detector 58. In this manner, failure information related to failures in the detectors is accumulated.

Second Preferred Embodiment

Figure 8:
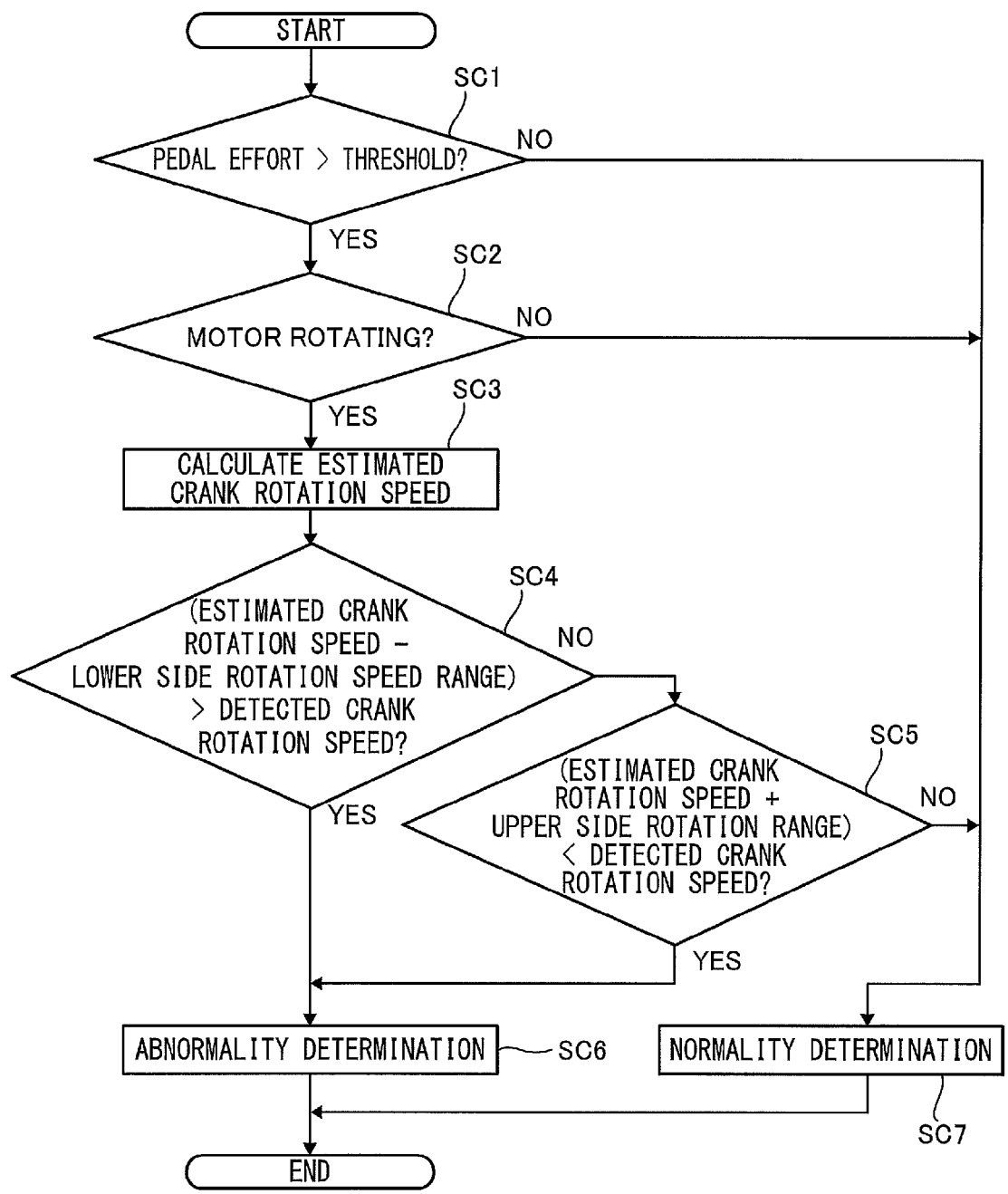
FIG. 8 is a flowchart for illustrating sensor failure determination in a battery-assisted bicycle according to a second preferred embodiment of the present invention.

FIG. 8 is a flowchart for illustrating sensor failure determination for a battery-assisted bicycle according to a second preferred embodiment of the present invention. The sensor failure determination flow according to the second preferred embodiment is different from the failure determination flow according to the first preferred embodiment in that a rotation speed of the crankshaft 41 obtained from a determination result by the crank rotation detector 58 is compared to a value in a prescribed range with respect to an estimated rotation speed. In the following description, the same elements as those according to the first preferred embodiment are designated by the same reference characters and their description will not be provided while only elements different from those according to the first preferred embodiment will be described.

Steps SC1 to SC3, SC6, and SC7 in the flow in FIG. 8 are the same as steps SA1 to SA3, SA5, and SA6, respectively, in the flow in FIG. 6 according to the first preferred embodiment. Therefore, steps SC1 to SC3, SC6, and SC7 will not be described in detail.

In the flow shown in FIG. 8, if a pedaling effort is greater than a threshold (YES in step SC1) and the electric motor 61 rotates (YES in step SC2), an estimated rotation speed of the crankshaft 41 (hereinafter also referred to as "estimated crank rotation speed") is calculated in step SC3. Then, in step SC4, it is determined whether a value produced by subtracting a lower side rotation speed range (a fluctuation range on the decreasing side of the rotation speed) from the estimated crank rotation speed obtained in step SC3 is greater than a rotation speed of the crankshaft obtained from a detection result by the crank rotation detector 58 (hereinafter also referred to as "detected crank rotation speed"). In step SC4, a rotation speed based on the estimated crank rotation speed that takes into account errors in the rotation speeds of the electric motor 61 and the crankshaft 41 (such as a detection error and a rotation speed change) and the detected crank rotation speed are compared. More specifically, it is determined in step SC4 whether the detected crank rotation speed is included in the range of the estimated crank rotation speed that takes errors into account.

If it is determined in step SC4 that the value produced by subtracting the lower side rotation speed range from the estimated crank rotation speed is greater than the detected crank rotation speed (YES), the control proceeds to step SC6 and sensor abnormality is determined. More specifically, if the result of determination in step SC4 is YES, the detected crank rotation speed is not included within the range of rotation speed based on the estimated crank rotation speed that takes errors into account, and sensor abnormality is determined.

On the other hand, if it is determined in step SC4 that the value produced by subtracting the lower side rotation speed range from the estimated crank rotation speed is not greater than the detected crank rotation speed (NO), the control proceeds to step SC5. It is determined in step SC5 whether a value produced by adding an upper side rotation speed range (a fluctuation range on the increasing side of the rotation speed) to the estimated crank rotation speed obtained in step SC3 is less than the detected crank rotation speed. Similarly to step SC4, it is determined in step SC5 whether the detected crank rotation speed is included within the range of rotation speed based on the estimated crank rotation speed that takes into account errors in the rotation speeds of the electric motor 61 and the crankshaft 41 (such as a detection error and a rotation speed change).

If it is determined in step SC5 that the value produced by adding the upper side rotation speed range to the estimated crank rotation speed is less than the detected crank rotation speed (YES), the control proceeds to step SC6 and sensor abnormality is determined.

On the other hand, if it is determined that the value produced by adding the upper side rotation speed range to the estimated crank rotation speed is not less than the detected crank rotation speed (NO), the detected crank rotation speed is within a prescribed range (prescribed value) produced by incorporating errors on the positive and negative sides into the estimated crank rotation speed. Therefore, the control proceeds to step SC7 and each detector is determined as being normal.

In this manner, erroneous determination caused by errors and the like in the rotation speeds of the electric motor 61 and the crankshaft 41 is reduced by determining whether the detected crank rotation speed is included within the prescribed range with respect to the estimated crank rotation speed. More specifically, if the rotation speeds of the electric motor 61 and the crankshaft 41 fluctuate, sensor failure determination is carried out accurately.

According to the present preferred embodiment, the motor rotation detector 68 is arranged to detect a rotation speed of the electric motor 61. The crank rotation detector 58 is arranged to detect a rotation speed of the crankshaft 41. The sensor failure detector 106 includes the crank rotation estimation unit 113 that estimates a rotation speed of the crankshaft 41 based on the rotation speed of the electric motor 61 detected by the motor rotation detector 68, the rotation speed comparator 114 that compares the rotation speed of the crankshaft 41 detected by the crank rotation detector 58 and the rotation speed of the crankshaft 41 estimated by the crank rotation estimation unit 113, and the failure determination unit 115 that determines that at least one of the motor rotation detector 68, the torque detector 57, and the crank rotation detector 58 has a failure if rotation of the electric motor 61 is detected by the motor rotation detector 68, a generation of pedaling effort is detected by the torque detector 57, and the rotation speed comparator 114 determines that the difference between the detected value and the estimated value for the rotation speed of the crankshaft 41 is greater than the prescribed value.

In this manner, a structure that accurately detects a failure in at least one of the motor rotation detector 68, the torque detector 57, and the crank rotation detector 58 is implemented. More specifically, if an error is generated during detection by the motor rotation detector 68 and the crank rotation detector 58, a detection value and an estimated value for the rotation speed of the crankshaft 41 is compared without being affected by the error. Therefore, sensor failure determination by the failure determination unit 115 is carried out accurately.

In the present preferred embodiment, the sensor failure detector 106 preferably includes the crank rotation estimation unit 113 and rotation speed comparator 114; however, the present preferred embodiment is not limited to such a configuration. In a first variation of the present preferred embodiment, the sensor failure detector 106 may include a first converter, a second converter, and a first rotation speed comparator. The first converter converts the rotation speed of the electric motor 61 detected by the motor rotation detector 68 into one of a rotation speed of the electric motor 61, a rotation speed of the crankshaft 41, and a reduction ratio of the electric motor 61. The second converter converts the rotation speed of the crankshaft 41 detected by the crank rotation detector 58 into one of a rotation speed of the electric motor 61, a rotation speed of the crankshaft 41, and a reduction ratio of the electric motor 61 that is of the same category as that for the conversion by the first converter. The first rotation speed comparator compares the converted value from the first converter with the converted value from the second converter. If the motor rotation detector 68 detects rotation of the electric motor 61, the torque detector 57 detects a generation of pedaling effort and the first rotation speed comparator determines that the difference between the converted value from the first converter and the converted value from the second converter is larger than a prescribed value, the failure determination unit 115 determines that at least one of the motor rotation detector 68, the torque detector 57, and the crank rotation detector 58 has a failure.

In a second variation of the present preferred embodiment, the sensor failure detector 106 may include a third converter, a fourth converter, and a second rotation speed comparator. The third converter converts the rotation speed of the crankshaft 41 detected by the crank rotation detector 58 into one of a rotation speed of the electric motor 61, a rotation speed of the crankshaft 41, and a reduction ratio of the electric motor 61. The fourth converter converts the rotation speed of the electric motor 61 detected by the motor rotation detector 68 into a value of the same category as that for the conversion by the third converter. The second rotation speed comparator compares the converted value from the third converter with the converted value from the fourth converter. If the crank rotation detector 58 detects rotation of the crankshaft 41, the torque detector 57 detects a generation of pedaling effort and the second rotation speed comparator determines that the difference between the converted value from the third converter and the converted value from the fourth converter is larger than a prescribed value, the failure determination unit 115 determines that at least one of the motor rotation detector 68, the torque detector 57, and the crank rotation detector 58 has a failure.

Third Preferred Embodiment

Figure 9:
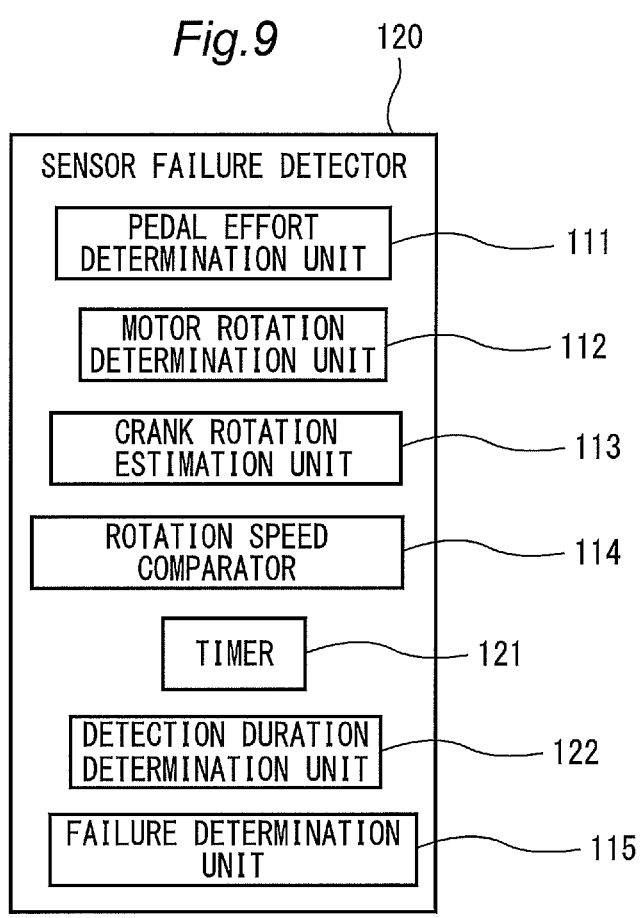
FIG. 9 is a block diagram of a general structure of a sensor failure detector in a battery-assisted bicycle according to a third preferred embodiment of the present invention.

FIG. 9 shows a general structure of a sensor failure detector 120 in a battery-assisted bicycle according to a third preferred embodiment of the present invention. The structure according to the third preferred embodiment is different from the structure according to the first preferred embodiment in that its sensor failure detector 120 includes a timer 121 to count an abnormality detection duration and a detection duration determination unit 122. In the following description, the same elements as those according to the first preferred embodiment are designated by the same reference characters and their description will not be repeated while only elements different from the first preferred embodiment will be described.

As shown in FIG. 9, the sensor failure detector 120 includes the timer 121 (duration measuring unit) and the detection duration determination unit 122. The sensor failure detector 120 preferably has the same structure as that of the sensor failure detector 106 except for the timer 121 and the detection duration determination unit 122.

The timer 121 counts a duration in which it is determined that an estimated rotation speed of the crankshaft 41 (hereinafter also referred to as "estimated crank rotation speed") and a rotation speed of the crankshaft 41 obtained from a detection result by the crank rotation detector 58 (hereinafter also referred to as "detected crank rotation speed") are different if a pedaling effort is greater than a threshold and the electric motor 61 rotates. Hereinafter, the duration will be also referred to as "abnormality detection duration." More specifically, the timer 121 counts how long the state determined as being abnormal according to the first preferred embodiment continues.

The timer 121 resets the counted duration if it is determined that each detector operates in a normal range.

The detection duration determination unit 122 determines whether the abnormality detection duration counted by the timer 121 is greater than a prescribed time period. Note that the prescribed time period is set to a time period during which each detector is determined as being abnormal that takes into account detection errors and the like.

Figure 10:
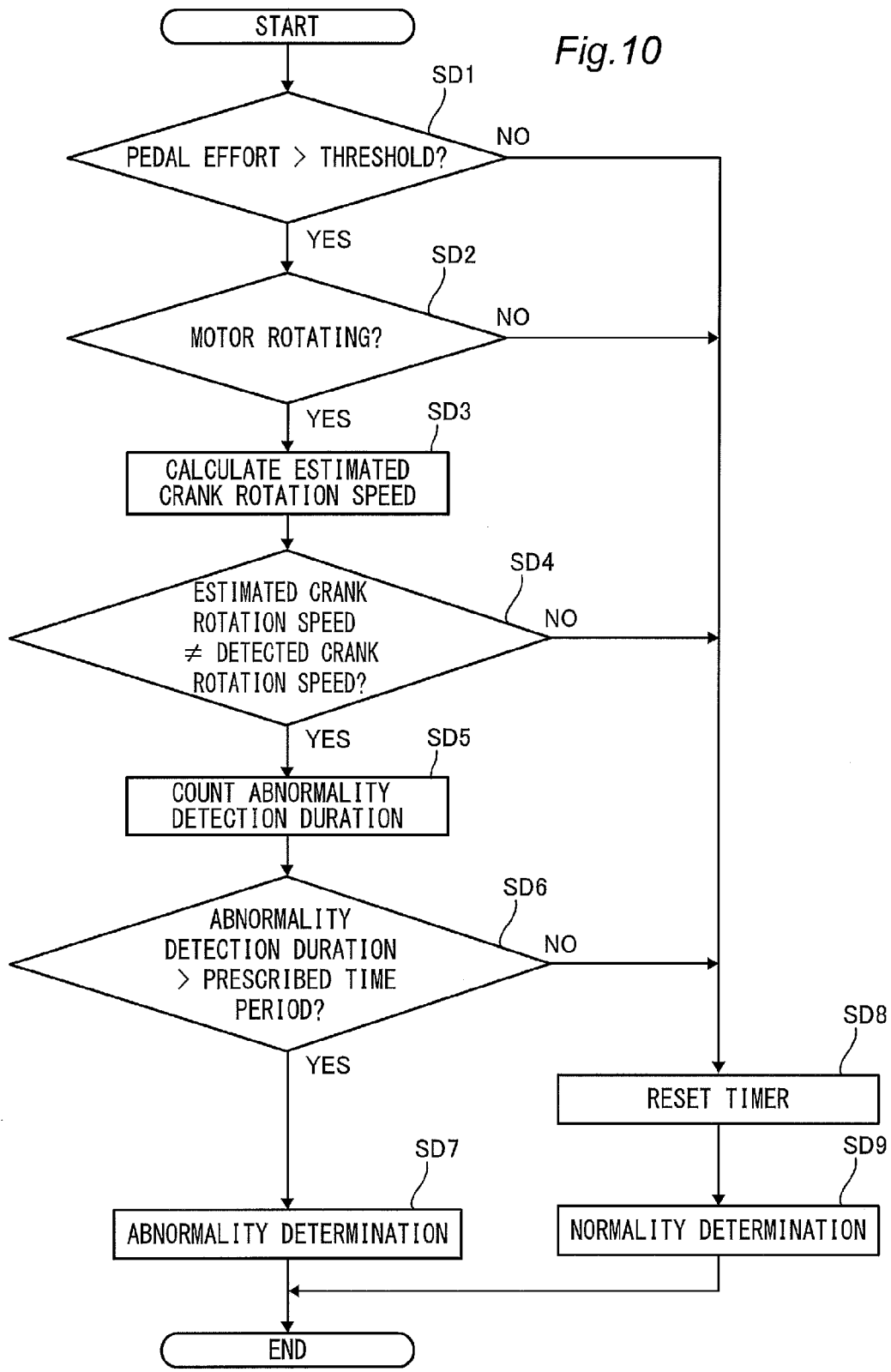
FIG. 10 is a flowchart for illustrating sensor failure determination in the battery-assisted bicycle according to the third preferred embodiment of the present invention.

FIG. 10 is a flowchart for illustrating sensor failure determination in the structure according to the present preferred embodiment. In FIG. 10, steps SD1 to SD4, SD7, and SD9 are the same as steps SA1 to SA4, SA5, and SA6 in the flow in FIG. 6 according to the first preferred embodiment. Therefore, steps SD1 to SD3, SD7, and SD9 will not be described in detail.

In the flow in FIG. 10, if a pedaling effort is greater than a threshold (YES in step SD1) and the electric motor 61 rotates (YES in step SD2), it is determined whether an estimated crank rotation speed is different from a detected crank rotation speed (step SD4).

If it is determined in step SD4 that the estimated crank rotation speed is different from the detected crank rotation speed (YES), the control proceeds to the succeeding step SD5 and the duration of the determination (abnormality detection duration) is counted using the timer 121.

On the other hand, if the estimated crank rotation speed is determined as being equal to the detected crank rotation speed in step SD4 (NO), the control proceeds to step SD8 to reset the count of the timer 121, and then it is determined in step SD9 that each detector is normal. Then, the flow ends (END).

Note that if it is determined in step SD1 that the pedaling effort is not more than the threshold (NO) and it is determined in step SD2 that the electric motor 61 does not rotate (NO), the control proceeds to step SD8 to reset the count of the timer 121, and then it is determined in step SD9 that each detector is normal. Then, the flow ends (END).

After the abnormality detection duration is counted by the timer 121 in step SD5, it is determined in step SD6 that the counted abnormality detection duration is longer than a prescribed time period by the detection duration determination unit 115. The prescribed time period is set to a time period in which each detector is determined as being abnormal that takes into account detection errors and the like.

If it is determined in step SD6 that the abnormality detection duration is longer than the prescribed time period (YES), the control proceeds to step SD7 to determine that each detector is abnormal. On the other hand, if it is determined that the abnormality detection duration is not longer than the prescribed time period (NO), the control proceeds to step SD8 to reset the timer 121, and then it is determined in step SD9 that each detector is normal. Then, the flow ends (END).

In this manner, if the pedaling effort is greater than the threshold, the electric motor 61 rotates, and the detected crank rotation speed is different from the crank rotation speed, it is determined that the state continues longer than the prescribed time period, so that sensor failure determination is carried out more accurately. More specifically, the structure according to the present preferred embodiment significantly reduces or prevents variations in failure determination by the detectors if output values from the detectors change because of detection errors at the detectors. Therefore, sensor failure determination with higher accuracy than that according to the first preferred embodiment is achieved.

According to the present preferred embodiment, the sensor failure detector 120 further includes the timer 121 arranged to measure a duration in which rotation of the electric motor 61 is detected by the motor rotation detector 68, a generation of pedaling effort is detected by the torque detector 57, and a difference between the estimated and detected rotation speeds of the crankshaft 41 is determined by the rotation speed comparator 114. The failure determination unit 115 determines that at least one of the motor rotation detector 68, the torque detector 57, and the crank rotation detector 58 has a failure if the duration measured by the timer 121 is longer than the prescribed time period.

In this manner, if output values from the detectors fluctuate temporarily, the detectors are not determined to have a failure unless the detection results by the detectors as described above continue for the prescribed time period or more. Therefore, failures in the detectors are detected accurately.

Fourth Preferred Embodiment

Figure 11:
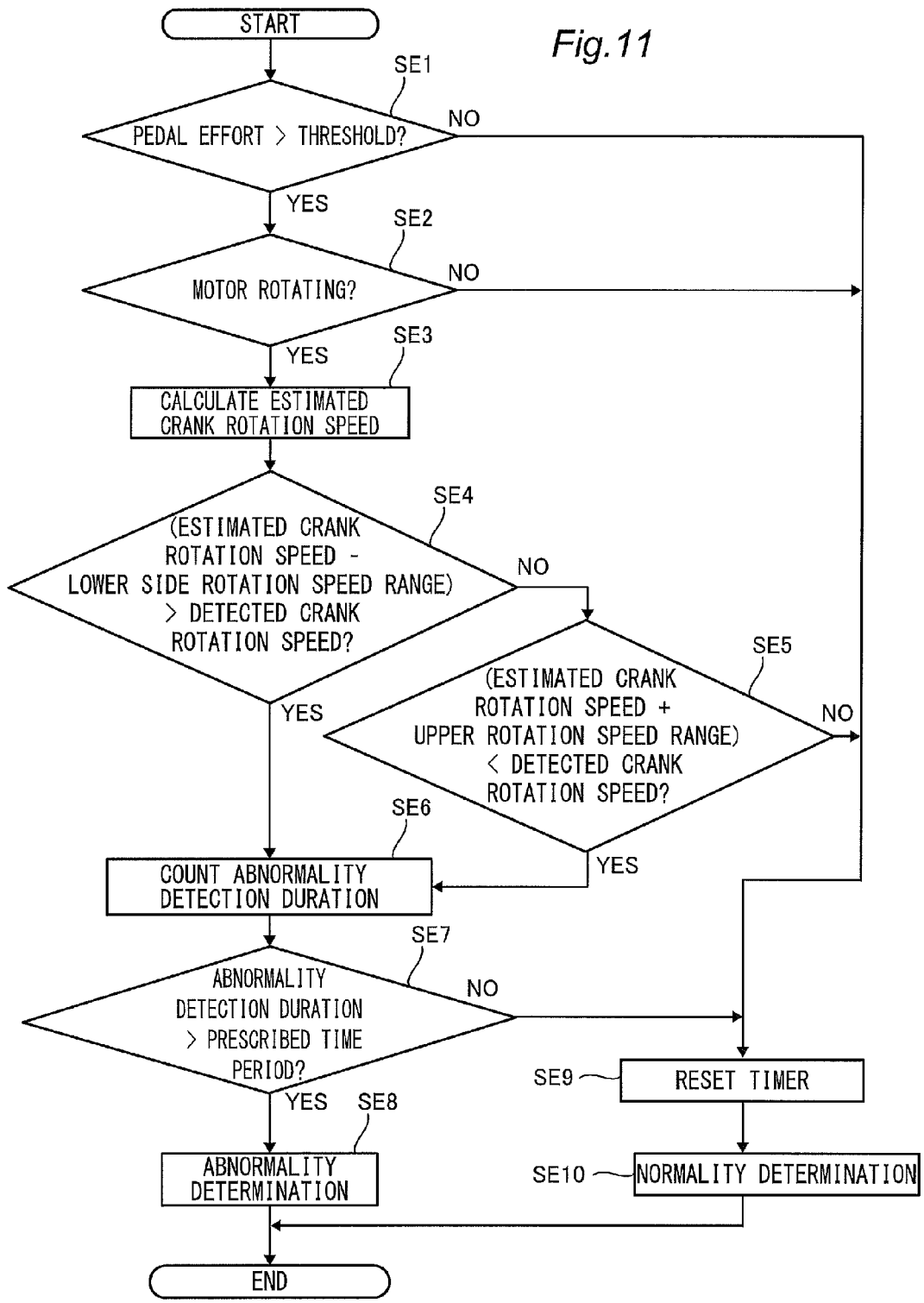
FIG. 11 is a flowchart for illustrating sensor failure determination in a battery-assisted bicycle according to a fourth preferred embodiment of the present invention.

FIG. 11 is a flowchart for illustrating sensor failure determination for a battery-assisted bicycle according to a fourth preferred embodiment of the present invention. The sensor failure determination flow according to the fourth preferred embodiment is different from the second preferred embodiment in that a duration in which a state determined as being abnormal according to the second preferred embodiment continues (abnormality detection duration) is counted by the timer 121 and the detection duration determination unit 122 according to the third preferred embodiment and the presence/absence of abnormality at each of the detectors is determined based on the result. In the following description, the same elements as those according to the second preferred embodiment are designated by the same reference characters and their description will not be repeated while only elements different from the second preferred embodiment will be described.

Steps SE1 to SE5, SE8, and SE10 in the flow shown in FIG. 11 are the same as steps SC1 to SC5, SC6, and SC7 in the flow shown in FIG. 8 according to the second preferred embodiment. Therefore, a detailed description of steps SE1 to SE5, SE8, and SE10 will not be provided.

In the flow shown in FIG. 11, if a pedaling effort is greater than a threshold (YES in step SE1), and the electric motor 61 rotates (YES in step SE2), it is determined whether a value obtained by subtracting a lower side rotation speed range from an estimated rotation speed of the crankshaft 41 (hereinafter also referred to as "estimated crank rotation speed") is greater than a rotation speed of the crankshaft 41 obtained based on a detection result from the crank rotation detector 58 (hereinafter also referred to as "detected crank rotation speed-")(step SE4).

If it is determined in step SE4 that the value obtained by subtracting the lower side rotation speed range from the estimated crank rotation speed is greater than the detected crank rotation speed (YES), the control proceeds to step SE6 and the duration of the determination (abnormality detection duration) is counted using the timer 121.

On the other hand, if it is determined in step SE4 that the value obtained by subtracting the lower side rotation speed range from the estimated crank rotation speed is not more than the detected crank rotation speed (NO), the control proceeds to step SE5. It is determined in step SE5 whether a value produced by adding an upper side rotation speed range to the estimated crank rotation speed is less than the detected rotation speed similarly to step SC5 shown in FIG. 8 according to the second preferred embodiment.

If it is determined in SE5 that the value produced by adding the upper side rotation speed range to the estimated crank rotation speed is less than the detected crank rotation speed (YES), the control proceeds to step SE6 to count the duration of the determination (abnormality detection duration) using the timer 121.

On the other hand, if it is determined in step SE5 that the value produced by adding the upper side rotation speed range to the estimated crank rotation speed is not less than the detected crank rotation speed (NO), the control proceeds to step SE9 to reset the timer 121. Then, in step SE10, each detector is determined as being normal and the flow ends (END).

Note that if it is determined in step SE1 that the pedaling effort is not more than the threshold (NO) and in step SE2 that the electric motor 61 does not rotate (NO), the control also proceeds to step SE9 to reset the count of the timer 121 and then each detector is determined as being normal in step SE10. Then, the flow ends (END).

The abnormality detection duration is counted by the timer 121 in step SE6, and it is then determined by the detection duration determination unit 122 in the succeeding step SE7 whether the abnormality detection duration counted in step SE6 is longer than a prescribed time period. If it is determined that the abnormality detection duration is longer than the prescribed time period (YES), the control proceeds to step SE8, each detector is determined as being abnormal, and then the flow ends (END).

On the other hand, if it is determined in step SE7 that the abnormality detection duration is not more than the prescribed time period (NO), the control proceeds to step SE9 to reset the timer 121, then each of the detectors is determined as being normal (step SE10), and the flow ends (END).

In this manner, a rotation speed of the crankshaft 41 obtained based on a detection result from the crank rotation detector 58 is compared to a range of the rotation speed based on an estimated crank rotation speed that takes errors or the like into account, so that sensor abnormality determination is carried out with increased accuracy similarly to the second preferred embodiment.

In addition, similarly to the third preferred embodiment, if it is determined that the battery-assisted bicycle 1 is in an abnormal state, each detector is not determined as being abnormal unless the abnormality detection duration is longer than the prescribed time period. Therefore, if output values from the detectors fluctuate because of detection errors at the detectors, variations in sensor failure determination are significantly reduced or prevented.

Therefore, sensor failure determination is carried out more accurately.

According to the present preferred embodiment, the sensor failure detector 120 further includes the timer 121 that measures a duration in which rotation of the electric motor 61 is detected by the motor rotation detector 68, a generation of pedaling effort is detected by the torque detector 57, and the rotation speed comparator 114 determines that the difference between the estimated and detected rotation speeds of the crankshaft 41 is larger than a prescribed value. The failure determination unit 115 determines that at least one of the motor rotation detector 68, the torque detector 57, and the crank rotation detector 58 has a failure if the duration measured by the timer 121 is longer than prescribed time period.

In this manner, similarly to the second preferred embodiment, if an error or the like is generated during detection by the motor rotation detector 68 and the crank rotation detector 58, a detected value and an estimated value for the rotation speed of the crankshaft 41 are compared without being affected by the error or the like. Therefore, sensor failure determination by the failure determination unit 115 is carried out accurately.

Furthermore, similarly to the third preferred embodiment, even if output values from the detectors temporarily fluctuate, each detector is not determined as having a failure unless the detection results as described above from the detectors continue to be output at least for a prescribed time period. Therefore, failures in the detectors are detected accurately.

In the present preferred embodiment, the sensor failure detector 106 includes a crank rotation estimation unit 113 and rotation speed comparator 114; however, the present preferred embodiment is not limited to such a configuration. Similar to the first variation of the second preferred embodiment, the sensor failure detector 106 may include a first converter, a second converter, and a first rotation speed comparator. If this is the case, the sensor failure detector 106 preferably includes a first duration measuring unit. The first duration measuring unit measures a duration in which rotation of the electric motor 61 is detected by the motor rotation detector 68, a generation of pedaling effort is detected by the torque detector 57, and the first rotation speed comparator determines that the difference between the converted value from the first converter and the converted value from the second converter is larger than a prescribed value. The failure determination unit 115 determines that at least one of the motor rotation detector 68, the torque detector 57, and the crank rotation detector 58 has a failure if the duration measured by the first duration measuring unit is longer than a prescribed time period.

Further, similar to the second variation of the second preferred embodiment, the sensor failure detector 106 may include a third converter, a fourth converter, and a second rotation speed comparator. If this is the case, the sensor failure detector 106 includes a second duration measuring unit. The second duration measuring unit measures a duration in which rotation of the crankshaft 41 is detected by the crank rotation detector 58, a generation of the pedaling effort is detected by the torque detector 57, and the second rotation speed comparator determines that the difference between the converted value from the third converter and the converted value from the fourth converter is larger than the prescribed value. The failure determination unit 115 determines that at least one of the motor rotation detector 68, the torque detector 57, and the crank rotation detector 58 has a failure if the duration measured by the second duration measuring unit is longer than a prescribed time period.

Fifth Preferred Embodiment

Figure 12:
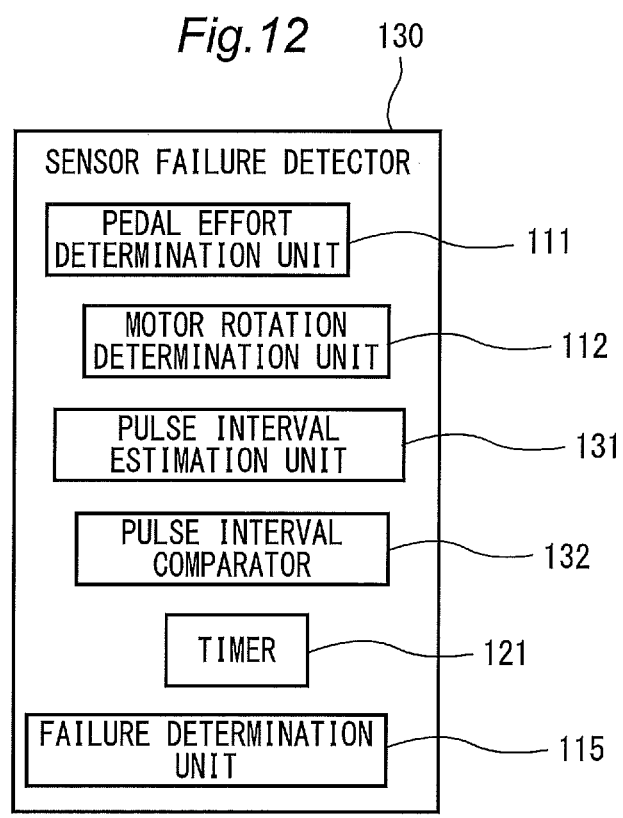
FIG. 12 is a block diagram of a general structure of a sensor failure detector in a battery-assisted bicycle according to a fifth preferred embodiment of the present invention.

FIG. 12 shows a general structure of a sensor failure detector 130 for a battery-assisted bicycle according to a fifth preferred embodiment of the present invention. The structure according to the fifth preferred embodiment is different from the structure according to the third preferred embodiment in that a pulse interval estimation unit 131 and a pulse interval comparator 132 are provided instead of the crank rotation estimation unit 113, the rotation speed comparator 114, and the detection duration determination unit 122. In the following description, the same elements as those of the third preferred embodiment are designated by the same reference characters and their description will not be provided while only elements different from the third preferred embodiment will be described.

As shown in FIG. 12, the sensor failure detector 130 includes a pedaling effort determination unit 111, a motor rotation determination unit 112, the pulse interval estimation unit 131, the pulse interval comparator 132, a timer 121, and a failure determination unit 115. The pedaling effort determination unit 111, the motor rotation determination unit 112, and the timer 121 are the same as those of the sensor failure detector 120 according to the second preferred embodiment and will not be described in detail.

The pulse interval estimation unit 131 estimates an interval of a pulse signal output from the crank rotation detector 58 based on a rotation speed of the electric motor 61 obtained by the motor rotation speed detector 103. The pulse signal is used to obtain a rotation speed of the crankshaft 41. The pulse signal interval is in inverse proportion to the rotation speed of the crankshaft 41. More specifically, the pulse interval estimation unit 131 estimates the rotation speed of the crankshaft 41 based on the rotation speed of the electric motor 61 similarly to the crank rotation estimation unit 113 according to the second preferred embodiment.

The pulse interval comparator 132 compares the estimated pulse interval (reference value) obtained by the pulse interval estimation unit 131 to an abnormality detection duration counted by the timer 121. More specifically, the pulse interval comparator 132 determines whether the abnormality detection duration is greater than the estimated pulse interval. Note that the abnormality detection duration according to the present preferred embodiment refers to a duration in which the crank rotation position detector 102 does not detect normal rotation (the rotation of the crankshaft 41 when the bicycle advances) of the crankshaft 41 if a pedaling effort obtained by the pedaling effort detector 101 is not less than a pedaling effort threshold and a rotation speed of the electric motor 61 obtained by the motor rotation speed detector 103 is not less than a rotation speed threshold. Note that the estimated pulse interval may be a fixed value.

The failure determination unit 115 determines abnormality in each detector if it is determined by the pulse interval comparator 132 that the abnormality detection duration is greater than the estimated pulse interval.

Figure 13:
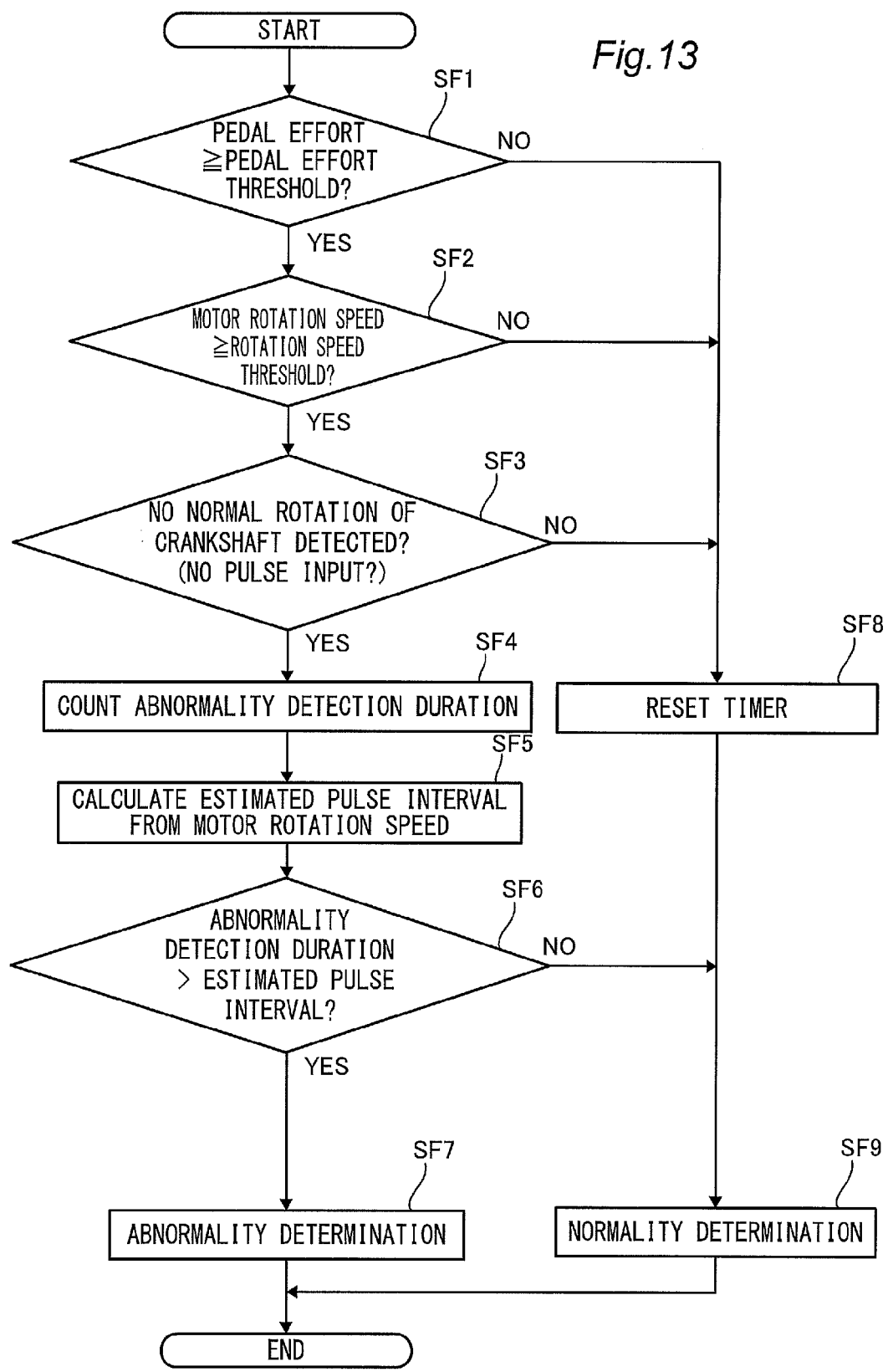
FIG. 13 is a flowchart for illustrating sensor failure determination in the battery-assisted bicycle according to the fifth preferred embodiment of the present invention.

FIG. 13 is a flowchart for illustrating sensor failure determination by the sensor failure detector 130 according to the present preferred embodiment.

When the flow in FIG. 13 starts (START), it is determined in step SF1 whether a pedaling effort obtained by the pedaling effort detector 101 is equal to or more than a pedaling effort threshold. The pedaling effort threshold is set to a minimum value within a range unaffected by noises or the like from the torque detector 57 based on which application of pedaling effort by a rider is determined, similarly to the pedaling effort threshold according to the first preferred embodiment.

If it is determined in step SF1 that the pedaling effort is equal to or more than the pedaling effort threshold (YES), the control proceeds to step SF2 and it is determined whether the rotation speed of the electric motor 61 is equal to or more than a rotation speed threshold. On the other hand, if it is determined that the pedaling effort is less than the pedaling effort threshold (NO), the control proceeds to step SF8 to reset the timer 121, then the detectors are determined as being normal and the flow ends (END).

In step SF2, it is determined whether the rotation speed of the electric motor 61 obtained by the motor rotation speed detector 103 is equal to or more than a rotation speed threshold. The rotation speed threshold is set to a minimum value within a range unaffected by noises or the like from the motor rotation detector 68 based on which rotation of the electric motor 61 is determined.

If it is determined in step SF2 that the rotation speed of the electric motor 61 is equal to or more than the rotation speed threshold (YES), it is determined in the succeeding step SF3 whether normal rotation of the crankshaft 41 is detected by the crank rotation position detector 102. On the other hand, if it is determined that the rotation speed of the electric motor 61 is less than the rotation speed threshold (NO), the control proceeds to step SF8 to reset the timer 121, then the detectors are determined as being normal in step SF9, and the flow ends (END).

It is determined in step SF3 whether the crankshaft 41 rotates normally based on a pulse signal output from the crank rotation detector 58. More specifically, the crank rotation detector 58 is arranged to output a pulse signal, for example, when the crankshaft 41 rotates normally. Therefore, the crank rotation position detector 102 determines normal rotation of the crankshaft 41 by detecting the pulse signal output from the crank rotation detector 58.

If it is determined in SF3 that normal rotation of the crankshaft 41 is not detected (YES), the control proceeds to step SF4 and counts the duration of the determination (an abnormality detection duration, a non-output period) by the timer 121. On the other hand, if normal rotation of the crankshaft 41 is detected (NO), the control proceeds to step SF8 to reset the timer 121, then the detectors are determined as being normal in step SF9, and the flow ends (END).

After the abnormality detection duration is counted in step SF4, the pulse interval estimation unit 131 calculates an estimated interval (reference value) based on the rotation speed of the electric motor 61 by the pulse interval estimation unit 131 in the succeeding step SF5. Then, it is determined in step SF6 by the pulse interval comparator 132 whether the abnormality detection duration counted in step SF4 is more than the estimated pulse interval obtained in the step SF5.

If it is determined in step SF6 that the abnormality detection duration is more than the estimated pulse interval (YES), the control proceeds to step SF7 to determine that each detector is abnormal, and then the flow ends (END). On the other hand, if it is determined that the abnormality detection duration is not more than the estimated pulse interval (NO), the control proceeds to step SF9 to determine that each detector is normal, and the flow ends (END).

In this manner, by using an interval of the pulse signal output from the crank rotation detector 58, sensor failure determination is carried out in a simpler manner than the case of obtaining a rotation speed of the crankshaft 41. More specifically, the use of the pulse interval allows for direct comparison with the abnormality detection duration counted by the timer 121, and therefore it is not necessary to obtain a rotation speed of the crankshaft 41 unlike the other preferred embodiments. Therefore, sensor failure determination is carried out with a simpler algorithm.

Furthermore, the abnormality detection duration is counted similarly to the third and fourth preferred embodiments, an abnormality state detected based on an output from each of the detectors is not determined as a sensor failure unless the abnormality detection duration is longer than a prescribed time period. Therefore, variations in sensor failure determination are significantly reduced or prevented if an output value from each detector fluctuates because of detection errors or the like by the detector.

Therefore, the sensor failure determination is carried out readily and accurately.

According to the present preferred embodiment, the sensor failure detector 130 determines that at least one of the motor rotation detector 68, the torque detector 57, and the crank rotation detector 58 has a failure if a detection result from the crank rotation detector 58 converted into one of rotation speeds of the electric motor 61 and the crankshaft 41 is less than a detection result from the motor rotation detector 68 converted into the above mentioned one rotation speed and torque generation is detected by the torque detector 57. More specifically, according to the present preferred embodiment, it is determined that any of the detectors has a failure if a pedaling effort is not less than a pedaling effort threshold and an interval of a pulse signal output from the crank rotation detector 58 is greater than an estimated pulse interval obtained from a rotation speed of the electric motor 61.

According to the present preferred embodiment, the crank rotation detector 58 outputs a pulse signal in response to rotation of the crankshaft 41. The sensor failure detector 130 determines whether at least one of the motor rotation detector 68, the torque detector 57, and the crank rotation detector 58 has a failure based on a pulse signal output from the crank rotation detector 58 if rotation of the electric motor 61 is detected by the motor rotation detector 68 and torque generation is detected by the torque detector 57. In this manner, unlike the above-described preferred embodiments, sensor failure determination is carried out using the pulse signal output from the crank rotation detector 58 without having to estimate a rotation speed of the crankshaft 41 based on a rotation speed of the electric motor 61 detected by the motor rotation detector 68. Therefore, the calculation load in the controller is reduced, which alleviates the sensor failure determination.

According to the present preferred embodiment, the sensor failure detector 130 includes the pulse interval estimation unit 131 that estimates an output interval of a pulse signal output from the crank rotation detector 58 based on an output result from the motor rotation detector 68, the pulse interval comparator 132 that compares a non-output period during which the next pulse signal is not output after a pulse signal is output from the crank rotation detector 58 and a pulse signal output interval estimated by the pulse interval estimation unit 131, and the failure determination unit 115 that determines that at least one of the motor rotation detector 68, the torque detector 57, and the crank rotation detector 58 has a failure if the non-output period is determined as being longer than the estimated pulse signal interval. In this manner, sensor failure determination is carried out using a pulse signal output from the crank rotation detector 58.

Other Preferred Embodiments

Although preferred embodiments of the present invention have been described and illustrated, it is clearly understood that the same is by way of illustration and example only. The present invention is not limited to the above-described preferred embodiments and can be modified in various forms without departing the scope and spirit of the present invention.

According to the above-described preferred embodiments, if it is determined that a pedaling effort is greater than a threshold and the electric motor 61 rotates, the sensor failure detectors 106, 120, and 130 each carry out a determination related to the rotation speed of the crankshaft 41. However, the sensor failure detectors may carry out a determination related to the presence/absence of pedaling effort, the presence/absence of rotation of the electric motor 61, and the rotation speed of the crankshaft 41 in any arbitrary order.

According to the above-described preferred embodiments, the sensor failure detectors 106, 120, and 130 each carry out a determination related to the rotation speed of the crankshaft 41 based on the rotation speed of the electric motor 61 detected by the motor rotation detector 68. However, the sensor failure detectors may carry out a determination related to the rotation speed of the electric motor 61 based on the rotation speed of the crankshaft 41.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A driving unit that assists a rider's pedaling effort, the driving unit comprising:
   an electric motor that provides a driving force;
   a crankshaft to which pedals are to be connected;
   a motor rotation detector that detects rotation of the electric motor;
   a torque detector that detects a torque generated at the crankshaft by the rider;
   a crank rotation detector that detects rotation of the crankshaft; and
   a sensor failure detector that detects a failure in at least one of the motor rotation detector, the torque detector, and the crank rotation detector based on detection results from all three of the motor rotation detector, the torque detector, and the crank rotation detector.

2. The driving unit according to claim 1, wherein the sensor failure detector detects a failure in at least one of the motor rotation detector, the torque detector, and the crank rotation detector using the detection result from the torque detector and a result of comparison between the detection result from the motor rotation detector and the detection result from the crank rotation detector.

3. The driving unit according to claim 2, wherein the sensor failure detector converts the detection result from the motor rotation detector and the detection result from the crank rotation detector into one of a rotation speed of the electric motor, a rotation speed of the crankshaft, and a reduction ratio of the electric motor.

4. The driving unit according to claim 3, wherein the sensor failure detector determines that at least one of the motor rotation detector, the torque detector, and the crank rotation detector has a failure if the detection result from the crank rotation detector converted into one of a rotation speed of the electric motor and a rotation speed of the crankshaft is lower than the detection result from the motor rotation detector converted into a rotation speed and the torque generation is detected by the torque detector.

5. The driving unit according to claim 1, wherein the sensor failure detector determines whether at least one of the motor rotation detector, the torque detector, and the crank rotation detector has a failure based on the detection result from the crank rotation detector if rotation of the electric motor is detected by the motor rotation detector and the torque generation is detected by the torque detector.

6. The driving unit according to claim 5, wherein the motor rotation detector is arranged to detect a rotation speed of the electric motor;
   the crank rotation detector is arranged to detect a rotation speed of the crankshaft; and
   the sensor failure detector includes:
      a first converter that provides a first converted value by converting the rotation speed of the electric motor detected by the motor rotation detector into one of a rotation speed of the electric motor, a rotation speed of the crankshaft, and a reduction ratio of the electric motor;
      a second converter that provides a second converted value by converting the rotation speed of the crankshaft detected by the crank rotation detector into a same one of a rotation speed of the electric motor, a rotation speed of the crankshaft, and a reduction ratio of the electric motor as that in the conversion by the first converter;
      a first rotation speed comparator that compares the first converted value from the first converter with the second converted value from the second converter; and
      a failure determination unit that determines that at least one of the motor rotation detector, the torque detector, and the crank rotation detector has a failure if rotation of the electric motor is detected by the motor rotation detector, a generation of pedaling effort is detected by the torque detector, and a difference between the first converted value from the first converter and the second converted value from the second converter is determined as being greater than a prescribed value by the first rotation speed comparator.

7. The driving unit according to claim 6, wherein the sensor failure detector further includes a first duration measuring unit that measures a duration in which rotation of the electric motor is detected by the motor rotation detector, the generation of the pedaling effort is detected by the torque detector, and the difference between the first converted value from the first converter and the second converted value from the second converter is determined as being greater than the prescribed value by the first rotation speed comparator; and
   the failure determination unit determines that at least one of the motor rotation detector, the torque detector, and the crank rotation detector has a failure if the duration measured by the first duration measuring unit is longer than a prescribed time period.

8. The driving unit according to claim 1, wherein the sensor failure detector determines whether at least one of the motor rotation detector, the torque detector, and the crank rotation detector has a failure based on the detection results from the motor rotation detector if the crank rotation detector detects rotation of the crankshaft and the torque detector detects generation of a torque.

9. The driving unit according to claim 8, wherein the crank rotation detector is arranged to detect a rotation speed of the crankshaft;
   the motor rotation detector is arranged to detect a rotation speed of the electric motor; and
   the sensor failure detector includes:
      a first converter that provides a first converted value by converting the rotation speed of the crankshaft detected by the crank rotation detector into one of a rotation speed of the electric motor, a rotation speed of the crankshaft, and a reduction ratio of the electric motor;
      a second converter that provides a second converted value by converting the rotation speed of the electric motor detected by the motor rotation detector into a same one of a rotation speed of the electric motor, a rotation speed of the crankshaft, and a reduction ratio of the electric motor as that in the conversion by the first converter;
      a rotation speed comparator that compares the first converted value from the first converter with the second converted value from the second converter; and
      a failure determination unit that determines that at least one of the motor rotation detector, the torque detector, and the crank rotation detector has a failure if the crank rotation detector detects rotation of the crankshaft, the torque detector detects generation of pedaling effort, and the rotation speed comparator determines that a difference between the first converted value from the first converter and the second converted value from the second converter is larger than a prescribed value.

10. The driving unit according to claim 9, wherein the sensor failure detector further includes a duration measuring unit that measures a duration in which rotation of the crankshaft is detected by the crank rotation detector, generation of the pedaling effort is detected by the torque detector, and the rotation speed comparator determines that the difference between the first converted value from the first converter and the second converted value from the second converter is larger than the prescribed value; and the failure determination unit determines that at least one of the motor rotation detector, the torque detector, and the crank rotation detector has a failure if the duration measured by the duration measuring unit is longer than a prescribed time period.

11. The driving unit according to claim 1, further comprising:

a driving wheel driven by a resultant force of a rotation driving force provided by the crankshaft and a rotation driving force provided by the electric motor;

a motive power transmission member that transmits the rotation driving forces from the crankshaft and the electric motor to the driving wheel;

a crank side one-way clutch provided between the crankshaft and the motive power transmission member to allow motive power to be transmitted only from the crankshaft to the motive power transmission member; and a motor side one-way clutch provided between the electric motor and the motive power transmission member to allow motive power to be transmitted only from the electric motor to the motive power transmission member.

12. The driving unit according to claim 1, wherein the crank rotation detector outputs a pulse signal in response to rotation of the crankshaft; and the sensor failure detector determines whether at least one of the motor rotation detector, the torque detector, and the crank rotation detector has a failure based on the pulse signal output from the crank rotation detector if rotation of the electric motor is detected by the motor rotation detector and the torque generation is detected by the torque detector.

13. The driving unit according to claim 12, wherein the sensor failure detector includes:

a pulse interval estimation unit that estimates an output interval of the pulse signal output from the crank rotation detector based on an output result from the motor rotation detector;

a pulse interval comparator that compares a non-output period, in which a succeeding pulse signal is not output after the pulse signal is output from the crank rotation detector, and the output interval of the pulse signal estimated by the pulse interval estimation unit; and a failure determination unit that determines that at least one of the motor rotation detector, the torque detector, and the crank rotation detector has a failure if the non-output period is determined as being longer than the estimated pulse signal interval by the pulse interval comparator.

14. The driving unit according to claim 1, further comprising an assist controller that is programmed to carry out assist control to have the electric motor driven in response to the pedaling effort, wherein the assist controller is programmed to restrain or stop the assist control if the sensor failure detector detects a failure in at least one of the motor rotation detector, the torque detector, and the crank rotation detector.

15. The driving unit according to claim 1, further comprising:

an indicator that indicates information to the rider; and an indication controller programmed to cause the indicator to indicate failure information if the sensor failure detector detects a failure in at least one of the motor rotation detector, the torque detector, and the crank rotation detector.

16. The driving unit according to claim 1, further comprising a storage that stores failure information if the sensor failure detector detects a failure in at least one of the motor rotation detector, the torque detector, and the crank rotation detector.

17. A battery-assisted bicycle including the driving unit according to claim 1.

* * * * *